(12) United States Patent
Kimura et al.

(10) Patent No.: US 11,784,867 B2
(45) Date of Patent: Oct. 10, 2023

(54) COMMUNICATION DEVICE AND COMMUNICATION METHOD

(71) Applicant: SONY GROUP CORPORATION, Tokyo (JP)

(72) Inventors: Ryota Kimura, Tokyo (JP); Hiroki Matsuda, Tokyo (JP); Yukitoshi Sanada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/761,874

(22) PCT Filed: Aug. 6, 2020

(86) PCT No.: PCT/JP2020/030169
§ 371 (c)(1),
(2) Date: Mar. 18, 2022

(87) PCT Pub. No.: WO2021/059768
PCT Pub. Date: Apr. 1, 2021

(65) Prior Publication Data
US 2022/0385523 A1  Dec. 1, 2022

(30) Foreign Application Priority Data

Sep. 27, 2019  (JP) ................. 2019-177202

(51) Int. Cl.
*H04L 27/34* (2006.01)
(52) U.S. Cl.
CPC ...... *H04L 27/3483* (2013.01); *H04L 27/3411* (2013.01)
(58) Field of Classification Search
CPC .............. H04L 27/00; H04L 27/3411; H04L 27/3483
See application file for complete search history.

(56) References Cited

U.S. PATENT DOCUMENTS

| 2016/0105300 A1 | 4/2016 | Wang et al. |
| 2018/0026725 A1* | 1/2018 | Cho ............... H04B 10/564 |
| | | 714/776 |

FOREIGN PATENT DOCUMENTS

| CN | 107995139 A | 5/2018 |
| WO | 2019/181223 A1 | 9/2019 |

OTHER PUBLICATIONS

International Search Report and Written Opinion of PCT Application No. PCT/JP2020/030169, dated Oct. 13, 2020, 08 pages of ISRWO.

* cited by examiner

*Primary Examiner* — Nader Bolourchi
(74) *Attorney, Agent, or Firm* — CHIP LAW GROUP

(57) ABSTRACT

A communication device includes an acquisition unit that acquires a bit sequence, and a conversion unit that converts the bit sequence to a predetermined complex constellation point sequence including a plurality of complex constellation points including a non-zero complex constellation point and a zero complex constellation point. At least one of the predetermined complex constellation point sequences is a first complex constellation point sequence in which each of a plurality of complex constellation points constituting the complex constellation point sequence is converted to any complex constellation point or zero complex constellation point of a first signal constellation including non-power of two number of complex constellation points. The conversion unit converts one of the bit sequences to at least the first complex constellation point sequence.

15 Claims, 24 Drawing Sheets

M=3

M=6

FIG.14
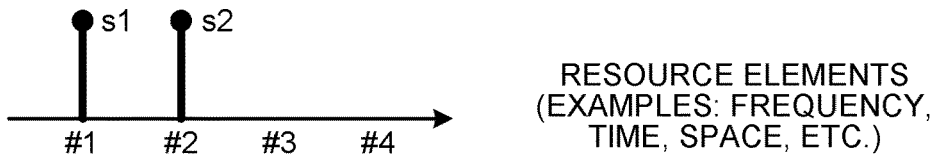
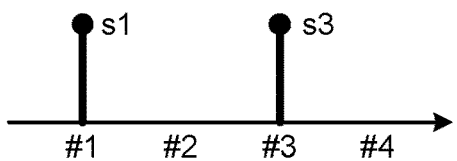
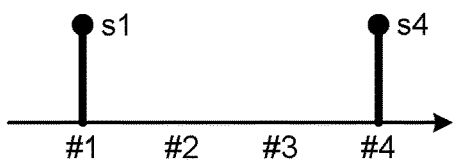
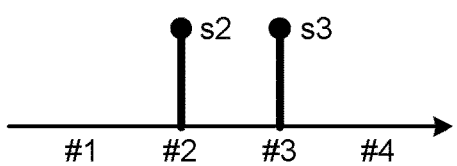
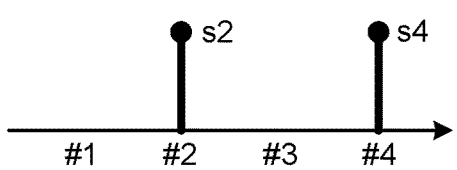
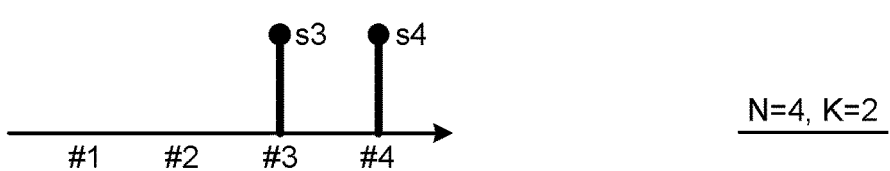
N=4, K=2

RESOURCE ELEMENTS
(EXAMPLES: FREQUENCY,
TIME, SPACE, ETC.)

N=4, K=2, M=6

FIG.16
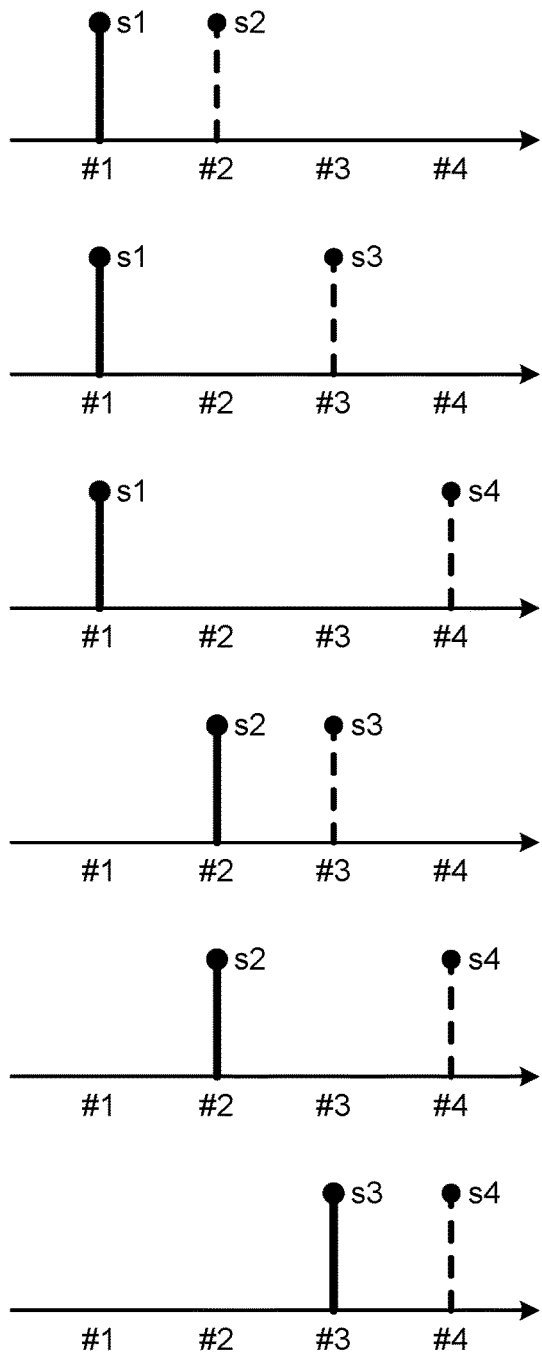
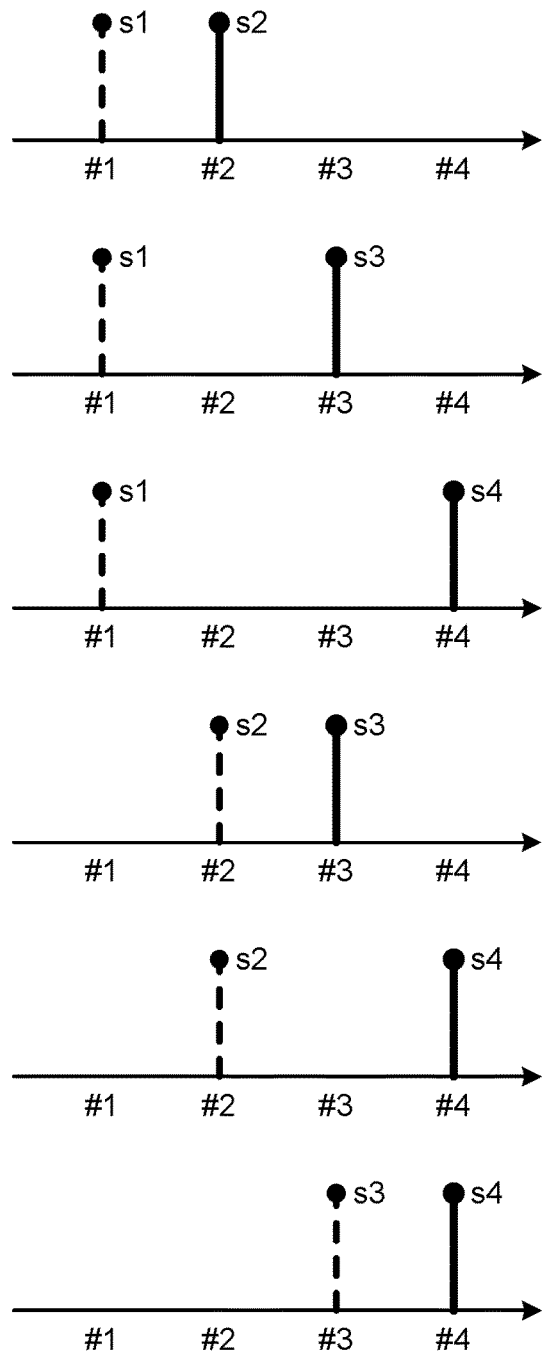
N=4, K₁=1, K₂=1

FIG.18
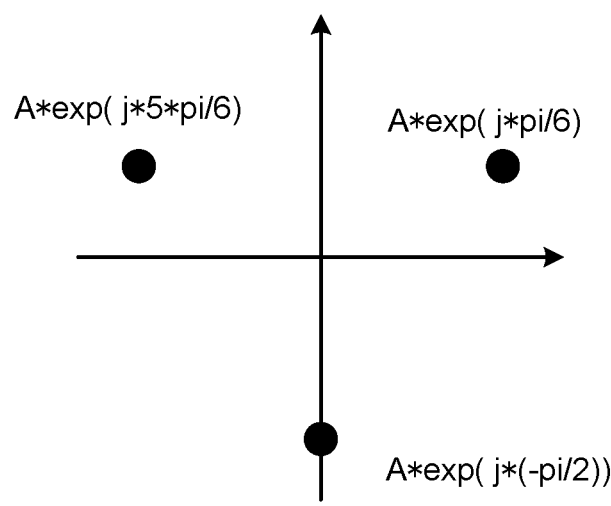
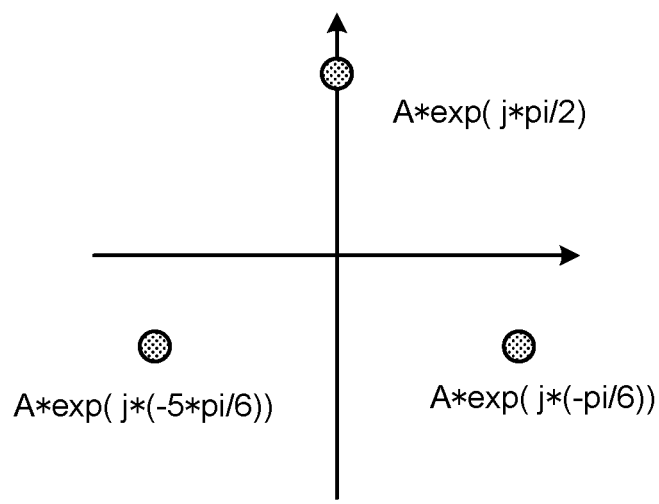

K=4

K=4

COMMUNICATION DEVICE AND COMMUNICATION METHOD

CROSS REFERENCE TO RELATED APPLICATIONS

This application is a U.S. National Phase of International Patent Application No. PCT/JP2020/030169 filed on Aug. 6, 2020, which claims priority benefit of Japanese Patent Application No. JP 2019-177202 filed in the Japan Patent Office on Sep. 27, 2019. Each of the above-referenced applications is hereby incorporated herein by reference in its entirety.

FIELD

The present disclosure relates to a communication device, a communication method, and a communication program.

BACKGROUND

There is known a modulation method called index modulation (IM) or parallel combinatory modulation. In IM, instead of mapping complex constellation points to all available resource elements, a complex constellation point is mapped only to a specific position (position of a specific resource element). Therefore, information can also be carried on a position to which the complex constellation point is mapped.

CITATION LIST

Patent Literature

Patent Literature 1: US 2016/0105300 A

SUMMARY

Technical Problem

In the conventional IM technology, it is difficult to say that the available resource elements are fully utilized. Therefore, it cannot be said that the conventional IM technology can achieve high communication performance such as a low error rate.

Therefore, the present disclosure proposes a communication device, a communication method, and a communication program that are configured to achieve high communication performance.

Solution to Problem

To solve the above problem, a communication device according to the present disclosure includes: an acquisition unit that acquires a bit sequence; and a conversion unit that converts the bit sequence to a predetermined complex constellation point sequence including a plurality of complex constellation points including a non-zero complex constellation point and a zero complex constellation point, wherein at least one of the predetermined complex constellation point sequences is a first complex constellation point sequence in which each of a plurality of complex constellation points constituting the complex constellation point sequence is converted to any complex constellation point or zero complex constellation point of a first signal constellation including non-power of two number of complex constellation points, and the conversion unit converts one of the bit sequences to at least the first complex constellation point sequence.

BRIEF DESCRIPTION OF DRAWINGS

FIG. 14 is a diagram illustrating resource element selection candidates.

FIG. 16 is a diagram illustrating resource element selection candidates.

FIG. 18 is a diagram illustrating an example of expansion of the complex signal constellation by phase rotation.

DESCRIPTION OF EMBODIMENTS

Figure 1:
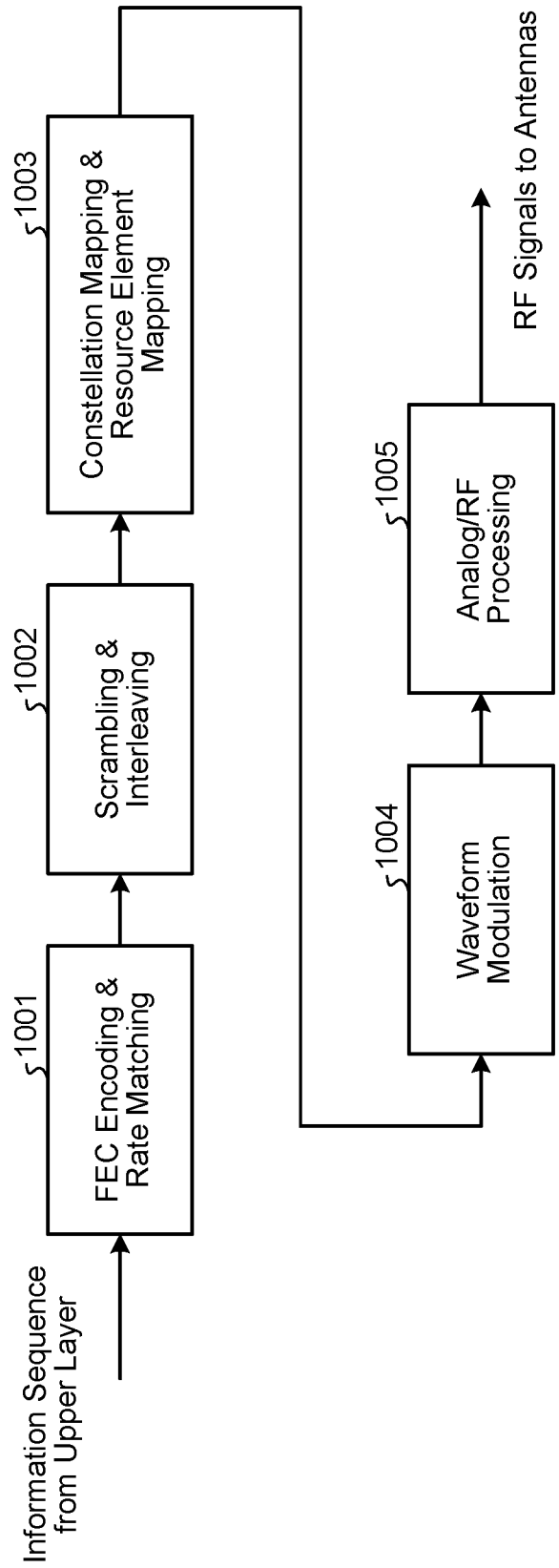
FIG. 1 is a block diagram schematically illustrating an example of signal processing related to data transmission according to an embodiment of the present disclosure.

The embodiments of the present disclosure will be described in detail below with reference to the drawings. Note that in the following embodiments, the same portions are denoted by the same reference numerals or symbols, and repetitive description thereof will be omitted.

Furthermore, the present disclosure will be described in the order of the items shown below.

1. Introduction
1-1. Outline of transmission process
1-2. Conventional modulation method
1-3. Overview of present embodiment
2. Configuration of communication system
2-1. Overall configuration of communication system
2-2. Configuration of management device
2-3. Configuration of base station device
2-4. Configuration of relay device
2-5. Configuration of terminal device
3. Operations of communication system
3-1. Signal constellation including non-power of two number of complex constellation points
3-2. Number of bits to be carried
3-3. Switching between complex signal constellations
3-4. Setting of various parameters
3-5. Expansion of signal constellation including non-power of two number of complex constellation points
3-6. Resource element mapping
3-7. Reception process
3-8. Setting process
4. Modifications
5. Conclusion

1. INTRODUCTION

<1-1. Outline of Transmission Process>

FIG. 1 is a block diagram schematically illustrating an example of signal processing related to data transmission according to an embodiment of the present disclosure. As illustrated in FIG. 1, a communication device that performs signal processing (transmission process) of the present embodiment includes a forward error correction (FEC) encoding and rate matching block 1001, a scrambling and interleaving block 1002, a constellation mapping and resource element mapping block 1003, a waveform modulation block 1004, and an analog/RF processing block 1005. Referring to FIG. 1, an input information sequence (e.g., bit sequence) from an upper layer is processed to output a radio frequency (RF) signal.

The FEC encoding and rate matching block 1001 acquires the input information sequence. The FEC encoding and rate matching block 1001 acquires the bit sequence (e.g., a transport block, packet, frame, or the like) transmitted from the upper layer (e.g., a data link layer, layer 2, or the like.) as the input information sequence. The FEC encoding and rate matching block 1001 performs error detection coding (e.g., cyclic redundancy check (CRC)), error correction coding (forward error correction (FEC), such as turbo coding, convolutional coding, LDPC coding, polar coding, and Reed-Solomon coding), and code rate adjustment (rate matching, such as puncturing and repetition), on the input information sequence.

The scrambling and interleaving block 1002 performs scrambling and interleaving on an encoded bit sequence output from the FEC encoding and rate matching block 1001, further enhancing the effect of error correction.

Thereafter, the constellation mapping and resource element mapping block 1003 converts the bit sequence output from the scrambling and interleaving block 1002 to a complex constellation point sequence and maps the complex constellation point sequence to a resource element, according to a method of the present embodiment. More specifically, the constellation mapping and resource element mapping block 1003 converts the bit sequence output from the scrambling and interleaving block 1002 to the complex constellation point sequence on the basis of a predetermined constellation (complex signal constellation). For the mapping of the bit sequence to the complex constellation points, various constellations, such as frequency shift keying (FSK), amplitude shift keying (ASK), phase shift keying (PSK), and quadrature amplitude modulation (QAM), can be used. Furthermore, the resource element mapping block 14 maps each of the complex constellation points included in the complex constellation point sequence after conversion to the resource element.

The waveform modulation block 1004 performs waveform modulation on each complex constellation point mapped to the resource element by the constellation mapping and resource element mapping block 1003. For example, the waveform modulation block 1004 performs waveform modulation according to orthogonal frequency division multiple access (OFDMA), single-carrier frequency division multiple access (SC-FDMA), generalized frequency division multiple access (GFDMA), filtered OFDMA (FOFDMA), universal filtered multi-carrier (UFMC), or the like.

The analog/RF processing block 1005 performs digital-to-analog conversion (DAC), then performs analog processing and RF processing, and transmits a radio wave from an antenna.

Note that in the present embodiment, the resource element represents one unit (i.e., a unit resource) of a resource specified by at least one of a frequency resource (subcarrier, subchannel, resource block, etc.), a time resource (symbol, slot, frames etc.), a spatial resource (an antenna, antenna port, spatial layer, spatial stream, etc.), and a code pattern (spreading code pattern, interleave pattern, scramble pattern, etc.).

<1-2. Conventional Modulation Method>

(Conventional Typical Modulation Method)

Figure 2:
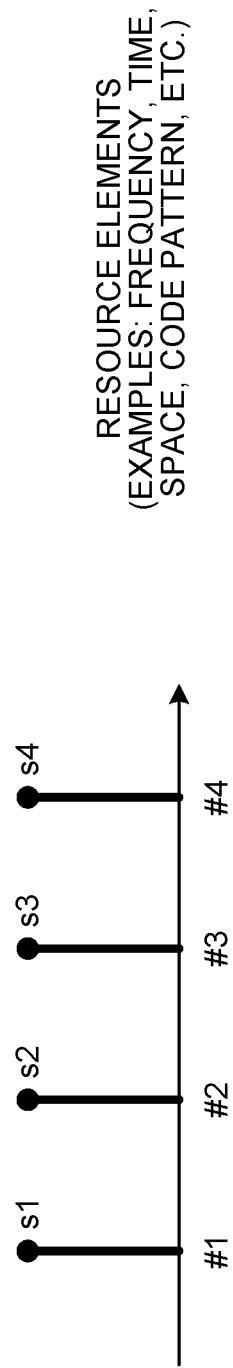
FIG. 2 is a diagram illustrating an example of resource element mapping in a conventional typical modulation method.

FIG. 2 is a diagram illustrating an example of resource element mapping in a conventional typical modulation method. As illustrated in FIG. 2, in the conventional typical modulation method, complex constellation points s1 to s4 are mapped to all available resource elements #1 to #4. The horizontal axis represents any resource element. A complex constellation point si is a complex constellation point mapped to an i-th resource element.

Note that information indicated by each complex constellation point is also referred to as information to be carried on the complex constellation point. In addition, indicating information by the complex constellation point is also referred to as carrying information on the complex constellation point.

(Conventional IM)

Meanwhile, the index modulation (IM) is known as a modulation method of converting the bit sequence to the complex constellation point sequence. IM is a modulation method of carrying the information on a combination of a resource element for mapping of the complex constellation point and a resource element for mapping of zero, by using a plurality of (e.g., N) resource elements (e.g., frequency, time, a spatial layer, precoding matrix, antenna port, antenna, etc.) that is used for modulation. IM is also referred to as parallel combinatory modulation, tone-phase-shift keying, or the like.

In the conventional IM, instead of mapping the complex constellation points to all available resource elements, the complex constellation point is mapped only to a specific position (position of a specific resource element). In the IM, part of the input information sequence is modulated into the complex constellation point, and the modulated complex constellation point is mapped to a position of the available resource element corresponding to the part of the input information sequence. In other words, in the IM, information is represented by the position to which the complex constellation point is mapped, in addition to the complex constellation point. In some cases, the mapping of the complex constellation point may be regarded as on/off of the resource element.

Figure 3:
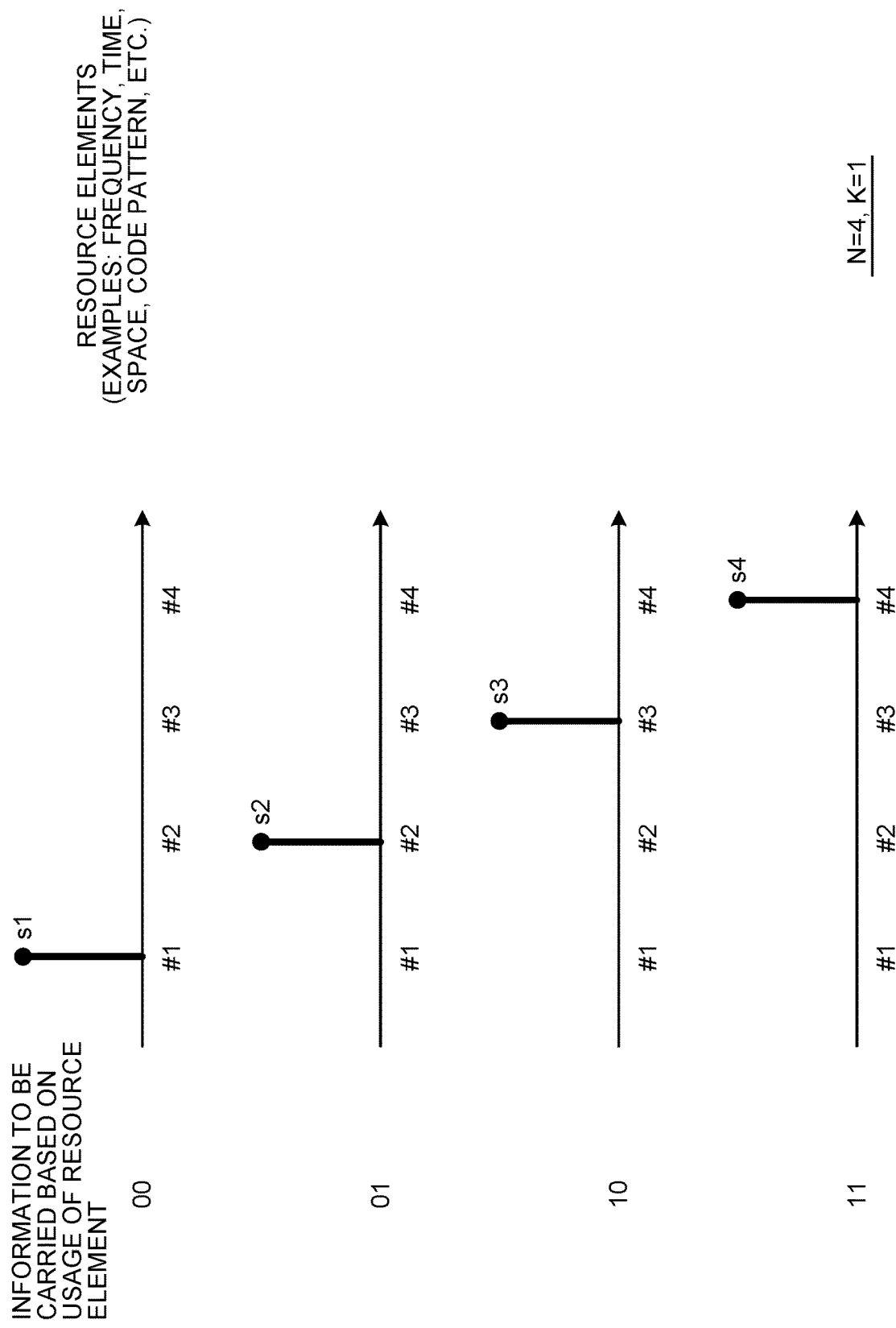
FIG. 3 is a diagram illustrating an example of modulation by conventional IM.

FIG. 3 is a diagram illustrating an example of modulation by the conventional IM. The horizontal axis represents any resource element. A complex constellation point si is a complex constellation point mapped to an i-th resource element. No complex constellation points are mapped to the resource elements for which the complex constellation point si is not illustrated. As illustrated in FIG. 3, the complex constellation point is mapped to one of four available resource elements #1 to #4. N is the number of available resource elements, and K is the number of resource elements to which the complex constellation points are mapped. The complex constellation point s1 mapped to the resource element #1 indicates information "00". The complex constellation point s2 mapped to the resource element #2 indicates information "01". The complex constellation point s3 mapped to the resource element #3 indicates information "10". The complex constellation point s4 mapped to the resource element #4 indicates information "11". As described above, in the example illustrated in FIG. 3, 2-bit information is indicated according to the position of the resource element to which the complex constellation point is mapped.

Figure 4:
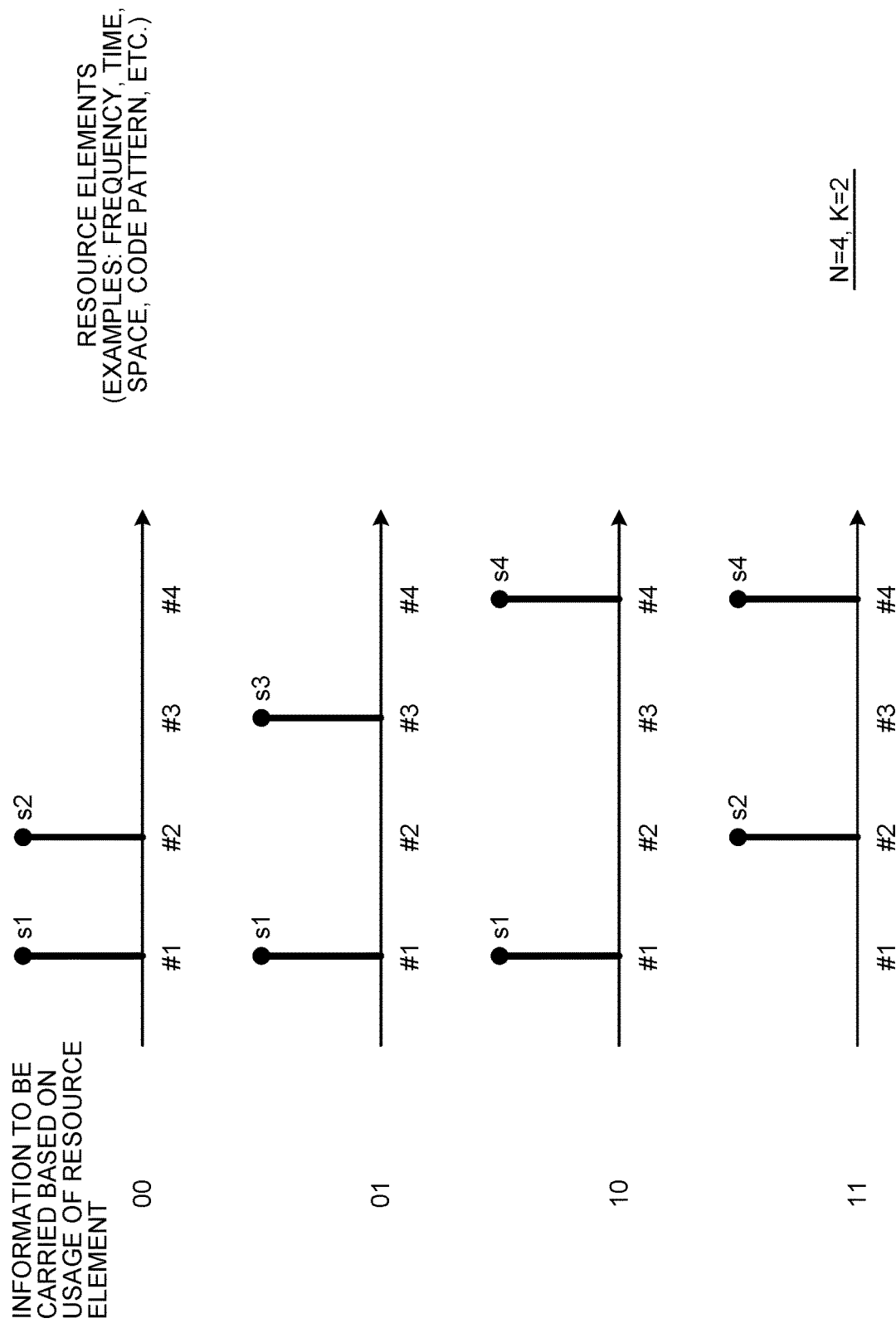
FIG. 4 is a diagram illustrating another example of the modulation by conventional IM.

FIG. 4 is a diagram illustrating another example of the modulation by conventional IM. The horizontal axis represents any resource element. A complex constellation point si is a complex constellation point mapped to an i-th resource element. No complex constellation points are mapped to the resource elements for which the complex constellation point si is not illustrated. As illustrated in FIG. 4, the complex constellation points are mapped to two of the four available resource elements #1 to #4 (N=4, K=2). The complex constellation points s1 and s2 mapped to the resource elements #1 and #2 indicate information "00". The complex constellation points s1 and s3 mapped to the resource elements #1 and #3 indicate information "01". The complex constellation points s1 and s4 mapped to the resource elements #1 and #4 indicate information "10". The complex constellation points s2 and s4 mapped to the resource elements #2 and #4 indicate information "11". As described above, in the example illustrated in FIG. 4, the 2-bit information is indicated according to the positions of the resource elements to which the complex constellation points are mapped.

The information indicated according to the position of the resource element to which the complex constellation point is mapped is also referred to as information to be carried based on the usage of the resource element. Furthermore, indicating information according to the position of the resource element is also referred to as carrying information based on the usage of the resource element.

The number of resource elements used to carry the complex constellation point sequence modulated at a time in IM is N. In other words, the number of resource elements required to carry the complex constellation point sequence modulated from the input information sequence having a predetermined bit length is represented by N. The predetermined bit length represents the sum of a bit length of the information to be carried based on the usage of the resource element and a bit length of information to be carried on the resource element.

Hereinafter, N resource elements are also referred to as a resource element block. N is the number of resource elements per resource element block. In addition, the number of resource elements of the resource element block to which the complex constellation points are mapped is represented by K. In FIG. 3, N=4 and K=1. In FIG. 4, N=4 and K=2. Note that in the conventional IM, the minimum value of K is 1.

<1-3. Overview of Present Embodiment>

In the conventional index modulation (IM), the signal constellation that includes M complex constellation points, such as amplitude shift keying (M-ASK), phase shift keying (M-PSK), or quadrature amplitude modulation (M-QAM), is used as a candidate complex signal constellation. In the conventional IM, M is limited to a power of two (i.e., $M=2^m$). For example, $M=2^1$ for BPSK, $M=2^2$ for QPSK, $M=2^3$ for 8PSK, $M=2^4$ for 16QAM, $M=2^5$ for 32QAM, and $M=2^6$ for 64QAM.

In the conventional IM, there has been a case where M being a power of two leads to unnecessary reduction of a distance between constellation points. Such a case is particularly noticeable when the number of resources, the number of elements, and the like used for IM increase.

For example, consider the signal constellation having signal points where $M=2^m$, for N resource elements. In this case, depending on the value of N, the number C of possible combinations of the complex constellation points may not be $2^n$ (n is an integer). In such a case, some of the C possible combinations cannot contribute to the modulation and are wasted. As a result of the waste, between the combinations, the distance between constellation points or a distance between codes is reduced, inviting the deterioration of error rate (bit error rate, symbol error rate, block error rate, frame error rate, packet error rate, and the like).

In the present embodiment, the waste is reduced as much as possible to improve the error rate. As will be described in detail later, in the present embodiment, in order to suppress the reduction in the distance between constellation points, a signal constellation including a non-power of two number of (non-$2^m$) complex constellation points will be introduced to IM. Here, the non-power of two represents a number that is not a power of two ($\neq 2^1$, $2^2$, $2^3$, $2^4$, $2^5$, $2^6$, . . . ). The introduction of the signal constellation including the non-power of two number of complex constellation points to IM makes it possible to increase the distance between constellation points or the distance between codes in IM than that in the conventional IM. Therefore, an error rate characteristic can be improved.

Although the overview of the present embodiment has been described above, a communication system according to the present embodiment will be described in detail below.

2. CONFIGURATION OF COMMUNICATION SYSTEM

A communication system 1 includes a base station device, for wireless connection with a terminal device.

Note that the communication system 1 may support a radio access technology (RAT) such as long term evolution (LTE) or new radio (NR). Each of LTE and NR is a type of cellular communication technology and enables mobile communication of the terminal device by arranging a plurality of areas covered by the base stations in the form of cells.

Note that in the following description, "LTE" includes LTE-Advanced (LTE-A), LTE-Advanced Pro (LTE-A Pro), and Evolved Universal Terrestrial Radio Access (EUTRA). In addition, NR includes New Radio Access Technology (NRAT) and Further EUTRA (FEUTRA). Note that a single base station may manage a plurality of cells. In the following description, a cell corresponding to LTE is referred to as an LTE cell, and a cell corresponding to NR is called an NR cell.

NR is a radio access technology (RAT) for a next generation (fifth generation) of LTE (fourth generation communication including LIE-Advanced and LIE-Advanced Pro). NR is a radio access technology that is configured to support various use cases including enhanced mobile broadband (eMBB), massive machine type communications (mMTC), and ultra-reliable and low latency communications (URLLC). NR has been studied for a technical framework that addresses usage scenarios, requirement conditions, and deployment scenarios in these use cases.

Hereinafter, the configuration of the communication system 1 will be described in detail.

<2-1. Overall Configuration of Communication System>

Figure 5:
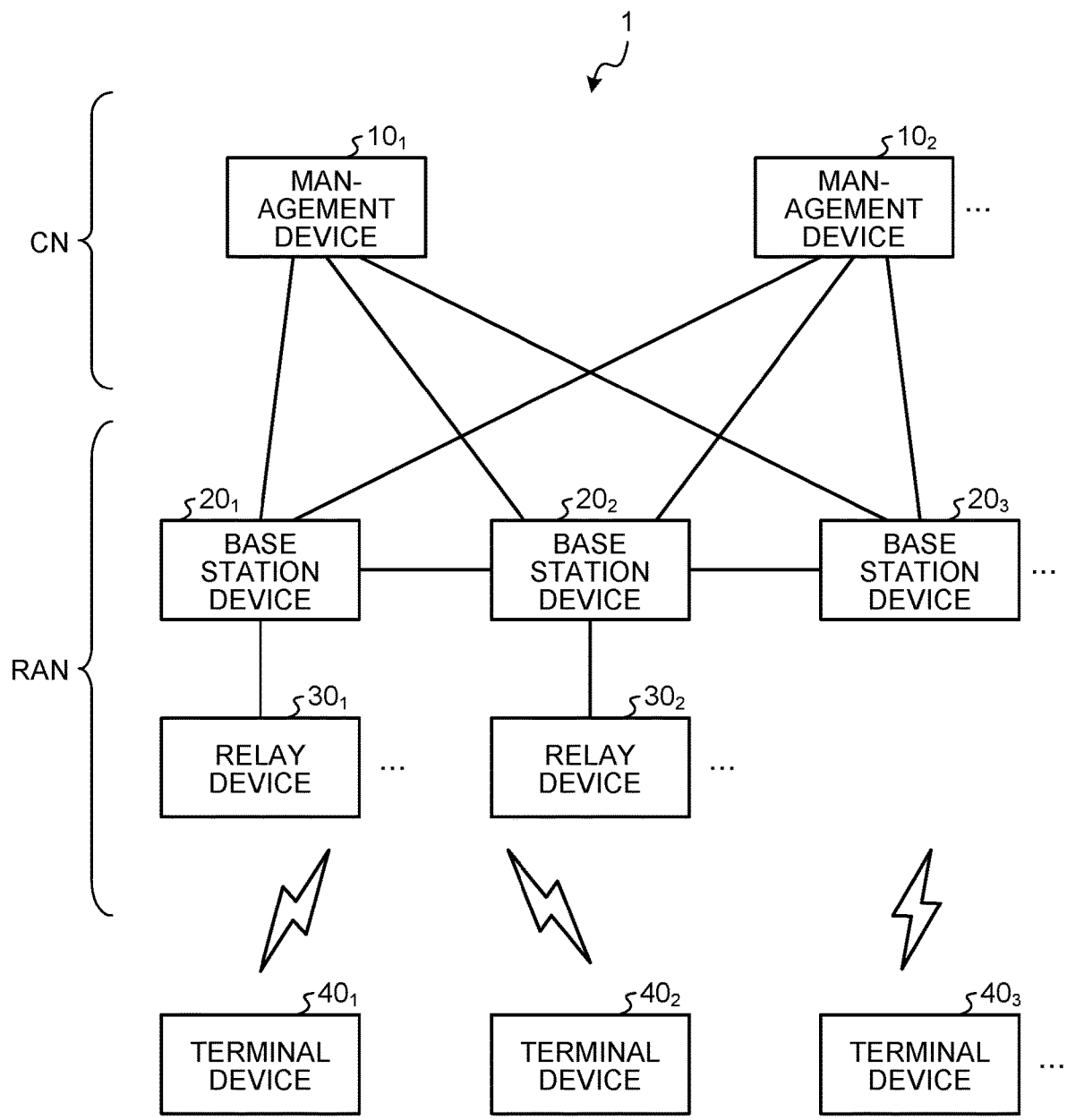
FIG. 5 is a diagram illustrating a configuration example of a communication system according to an embodiment of the present disclosure.

FIG. 5 is a diagram illustrating a configuration example of the communication system 1 according to an embodiment of the present disclosure. The communication system 1 is a radio communication system that provides a radio access network for the terminal device. For example, the communication system 1 is a cellular communication system using a radio access technology such as LTE or NR. Here, the radio access network may be an evolved universal terrestrial radio access network (E-UTRAN) or a next generation radio access network (NG-RAN).

As illustrated in FIG. 5, the communication system 1 includes a management device 10, a base station device 20, a relay device 30, and a terminal device 40. The communication system 1 provides, for a user, a radio network through which mobile communication can be performed by operating radio communication devices constituting the communication system 1 in cooperation with each other. The radio network of the present embodiment includes a radio access network RAN and a core network CN. The radio communication devices are a device having a radio communication function and correspond to the base station device 20, the relay device 30, and the terminal device 40 in the example of FIG. 5.

The communication system 1 may include a plurality of management devices 10, base station devices 20, relay devices 30, and terminal devices 40. In the example of FIG. 5, the communication system 1 includes management devices $10_1$, $10_2$, and the like as the management device 10. Furthermore, the communication system 1 includes base station devices $20_1$, $20_2$, $20_3$, and the like as the base station device 20, and relay devices $30_1$, $30_2$, and the like as the relay device 30. Still furthermore, the communication system 1 includes terminal devices $40_1$, $40_2$, $40_3$, and the like as the terminal device 40.

Note that the devices in the drawing may be considered devices in a logical sense. In other words, some of the devices in the drawing may be implemented by a virtual machine (VM), container, docker, or the like to be implemented physically on the same hardware.

Note that the base station for LTE may be referred to as an evolved Node B (eNodeB) or eNB. Furthermore, the base station for NR may be referred to as a Next Generation RAN node (NGRAN node), gNodeB, or gNB. Still furthermore, in LTE and NR, the terminal device (also referred to as a mobile station, a mobile station device, or a terminal) may be referred to as user equipment (UE). Note that the terminal device is a type of communication device and is also referred to as the mobile station, mobile station device, or terminal.

In the present embodiment, the concept of the communication device includes not only a portable mobile device (terminal device) such as a mobile terminal but also a device installed at a structure or mobile body. The structure or the mobile body itself may be regarded as the communication device. Furthermore, the concept of the communication device includes not only the terminal device but also the base station device and the relay device. The communication device is a type of processing device and information processing device. Furthermore, the communication device can also be referred to as a transmission device or a reception device.

[Management Device]

The management device 10 is a device that manages the radio network. For example, the management device 10 is a device that manages the communication of the base station devices 20. For example, the management device 10 is a device that functions as a mobility management entity (MME), an access and mobility management function (AMF), or a session management function (SMF). Note that MME is connected to EUTRAN through an S1 interface to control non-access stratum (NAS) signaling with the UE and manage the mobility of the UE. AMF is connected to NGRAN through an NG interface to control non-access stratum (NAS) signaling with UE or manage mobility of the UE.

The management device 10 may be included in the core network CN together with a gateway device or the like. The core network CN is, for example, a network of a predetermined entity such as a mobile network operator. For example, the core network CN includes, an evolved packet core (EPC) or a 5G core network (5GC). Note that the predetermined entity may be the same as or different from an entity that uses, operates, and/or manages the base station device 20.

Note that the core network transfers user data between a packet data network (OPDN) or data network (DN) and RAN, in addition to a control plane (C-Plane) node such as the management device 10. A user plane (U-plane) node may be included. The U-plane node in EPC may include a serving gateway (S-GW) or a PDN-gateway (P-GW). The U-plane node in 5GC may include a U-plane function (UPF). For example, the management device 10 manages whether the terminal device 40 (UE) in the communication system 1 is located at which position, for each terminal device 40 in each area (e.g., tracking area and RAN notification area) including a plurality of cells. Note that the management device 10 may grasp and manage, for each terminal device 40, whether the terminal device 40 is connected to which base station (or which cell), the terminal device 40 is located in a communication area of which base station (or which cell), or the like, in each cell.

Note that the management device 10 may have a gateway function. For example, when the core network is EPC, the management device 10 may have a function as S-GW or P-GW. Furthermore, when the core network is 5GC, the management device 10 may have a function as a user plane function (UPF). In addition, the management device 10 may have SMF, PCF, UDM, or the like. The core network CN may include SMF, PCF, UDM, or the like.

Note that the management device 10 may not necessarily be a device that constitutes the core network CN. For example, it is assumed that the core network CN is a core network for wideband code division multiple access (W-CDMA) or code division multiple access 2000 (cdma2000). At this time, the management device 10 may be a device that functions as a radio network controller (RNC).

The management devices 10 are connected to the plurality of base station devices 20. For example, in 5GS, there is an N2 reference point between AMF and NG-RAN, and the AMF and the NG-RAN are logically connected to each other via the NG interface.

The management devices 10 manages the communication of the base station devices 20. For example, the management device 10 manages whether the terminal device 40 is located at which position, for each terminal device 40 in each area (e.g., tracking area and RAN notification area) including a plurality of cells. Note that the management device 10 may grasp and manage, for each terminal device 40, whether the terminal device 40 is connected to which base station device (or which cell), the terminal device 40 is located in a communication area of which base station device (or which cell), or the like.

(Base Station Device)

The base station device 20 is a radio communication device that establishes radio communication with the terminal device 40. The base station device 20 is a type of communication device. In addition, the base station device 20 is a type of information processing device.

The base station device 20 may be, for example, a device corresponding to a radio base station (Node B, eNB, gNB, etc.) or a wireless access point. Note that in a case where the base station device 20 is the eNB, gNB, or the like, the base station device 20 may be referred to as 3GPP access. Furthermore, in a case where the base station device 20 is the wireless access point, the base station device 20 may be referred to as non-3GPP access. Furthermore, the base station device 20 may be a wireless relay node. Furthermore, the base station device 20 may be an optical remote device called remote radio head (RRH). Furthermore, the base station device 20 may be a receiving station device such as a field pickup unit (FPU). Furthermore, the base station device 20 may be an integrated access and backhaul (IAB) donor node or IAB relay node that provides a radio access network and a radio backhaul network by using time division multiplexing, frequency division multiplexing, or space division multiplexing.

Note that, in a case where the base station device 20 is gNB, the base station device may be referred to as a combination of a gNB central unit (CU) and a gNB distributed unit (DU) or any thereof. In the present embodiment, the base station of the radio communication system is referred to as the base station device, in some cases. The base station device 20 may be capable of radio communication with another base station device 20. For example, in a case where a plurality of base station devices 20 is eNB or has a combination of the eNB and gNB, the devices may be connected through an X2 interface. Furthermore, in a case where the plurality of base station devices 20 is gNB or has a combination of the eNB and gNB, the devices may be connected through an Xn interface. Furthermore, in a case where the plurality of base station devices 20 has a combination of the gNB CU and the gNB DU, the devices may be connected through an F1 interface. Message/information (RRC signaling information or DCI information), which is described later, may be communicated between the plurality of base station devices 20 (e.g., via the X2, Xn, or F1 interface).

Note that the radio access technology used by the base station device 20 may be a cellular communication technology or a wireless LAN technology. As a matter of course, the radio access technology used by the base station device 20 is not limited thereto, and may be another radio access technology. The radio access technology used by the base station device 20 may be a low power wide area (LPWA) communication technology. Here, LPWA communication is communication in conformance with an LPWA standard. Examples of the LPWA standard include ELTRES, ZETA, SIGFOX, LoRaWAN, and NB-Iot. As a matter of course, the LPWA standard is not limited thereto, and may be another LPWA standard. In addition, radio communication used by the base station device 20 may be millimeter wave radio communication. Furthermore, radio communication used by the base station device 20 may be radio communication using radio waves, or radio communication using infrared or visible light (optical radio communication).

The base station device 20 may be configured to perform non-orthogonal multiple access (NOMA) communication with the terminal device 40. Here, the NOMA communication is communication using a non-orthogonal resource (transmission, reception, or both). Note that the base station device 20 may be configured to perform NOMA communication with another base station device 20 and the relay device 30.

Note that the base station devices 20 may be communicable with each other via a base station device-core network interface (e.g., S1 Interface or the like). This interface may be wired or wireless. Furthermore, the base station devices may be communicable with each other via an interface between the base station devices (e.g., X2 Interface, S1 Interface, or the like). This interface may be wired or wireless.

Note that the plurality of base station devices 20 may be communicable with each other via the base station device-core network interface (e.g., NG Interface, S1 Interface, or the like). This interface may be wired or wireless. Furthermore, the base station devices may be communicable with each other via the interface between the base station devices (e.g., Xn Interface, X2 Interface, or the like). This interface may be wired or wireless.

Furthermore, the base station device 20 may include a set of a plurality of physical or logical devices. For example, in the present embodiment, the base station may be divided into a plurality of devices of a baseband unit (BBU) and a radio unit (RU) and considered as an assembly of the plurality of devices. Additionally or alternatively, in the embodiments of the present disclosure, the base station may be either or both of the BBU and the RU. BBU and RU may be connected through a predetermined interface (e.g., eCPRI). Additionally or alternatively, RU may be referred to as a remote radio unit (RRU) or Radio DoT (RD). Additionally or alternatively, RU may correspond to a gNB-DU which is described later. Additionally or alternatively, BBU may correspond to a gNB-CU to be described later. Additionally or alternatively, RU may be a device integrally formed with an antenna. The antenna (e.g., the antenna integrally formed with RU) of the base station may adopt an advanced antenna system and support MIMO (e.g., FD-MIMO) or beamforming. In the advanced antenna system, the antennas (e.g., the antenna integrally formed with RU) of the base station may include, for example, 64 transmission antenna ports and 64 reception antenna ports.

Note that a plurality of the base station devices 20 may be connected to each other. One or more base station devices 20 may be included in the radio access network (RAN). In other words, the base station may be simply referred to as RAN, a RAN node, an access network (AN), or a node. RAN in LTE is referred to as enhanced universal terrestrial RAN (EUTRAN). RAN in NR is referred to as NGRAN. RAN in W-CDMA (UMTS) is referred to as UTRAN.

Note that the base station for LTE may be referred to as evolved Node B (eNodeB) or eNB. In other words, EUTRAN includes one or more eNodeB (eNB). Furthermore, the base station for NR may be referred to as gNodeB or gNB. In other words, NGRAN includes one or more gNB. Furthermore, EUTRAN may include gNB (en-gNB) connected to the core network (EPC) in an LTE communication system (EPS). Likewise, NGRAN may include ng-eNB connected to the core network 5GC in a 5G communication system (5GS).

Furthermore, in a case where the base station is eNB, gNB, or the like, the base station may be referred to as 3GPP access. Furthermore, in a case where the base station is a wireless access point (Access Point), the base station may be referred to as non-3GPP access. Furthermore, the base station may be the optical remote device called remote radio head (RRH). Additionally or alternatively, in a case where the base station is gNB, the base station may be referred to as a combination of a gNB central unit (CU) and a gNB distributed unit (DU) or any thereof.

The gNB central unit (CU) hosts a plurality of upper layers (e.g., RRC, SDAP, and PDCP) of an access stratum for communication with UE. Meanwhile, the gNB-DU hosts a plurality of lower layers (e.g., RLC, MAC, and PHY) of the access stratum. In other words, of messages and information which are described later, RRC signalling (semi-static notification) may be generated by the gNB CU, and DCI (dynamic notification) may be generated by the gNB-DU. Alternatively, of RRC configuration (semi-static notification), for example, a partial configuration such as cell-GroupConfig information elements (IE) may be generated by the gNB-DU, and the remaining configurations may be generated by the gNB-CU. The configuration may be transmitted and received through the F1 interface.

The base station device 20 may be configured to be communicable with another base station device 20. For example, in a case where the plurality of base station devices 20 is eNB or has a combination of the eNB and en-gNB, the base station devices 20 may be connected through the X2 interface. Furthermore, in a case where the plurality of base station devices 20 is gNB or has a combination of the gn-eNB and gNB, the devices may be connected through the Xn interface. Furthermore, in a case where the plurality of base station devices 20 has a combination of the gNB central unit (CU) and the gNB distributed unit (DU), the devices may be connected through the F1 interface described above.

The message/information (RRC signalling information or DCI information) may be communicated between a plurality of base stations (e.g., via the X2, Xn, or F1 interface).

The base station device 20 can be used, operated, and/or managed by various entities. For example, a mobile network operator (MNO), a mobile virtual network operator (MVNO), a mobile virtual network enabler (MVNE), a neutral host network (NHN) operator, an enterprise, an educational institution (educational corporation, education board of each local government, etc.), a real estate (building, apartment house, etc.) administrator, an individual, and the like can be assumed as the entities.

As a matter of course, the entities of use, operation, and/or management of the base station device 20 are not limited thereto. The base station device 20 may be installed and/or operated by one business operator, or may be installed and/or operated by one individual. As a matter of course, the entity of installation/operation of the base station device 20 is not limited thereto. For example, the base station device 20 may be installed/operated by a plurality of business operators or a plurality of individuals in cooperation. Furthermore, the base station device 20 may be a shared facility used by a plurality of business operators or a plurality of individuals. In this case, installation and/or operation of the facility may be performed by a third party different from the users.

Note that the concept of the base station device (also referred to as the base station) includes not only a donor base station but also a relay base station (also referred to as a relay node, relay station, relay base station, or relay station device). Furthermore, the concept of the base station includes not only a structure with a function of the base station but also a device installed at the structure.

The structure is, for example, a building such as a high-rise building, house, steel tower, station facility, airport facility, harbor facility, or stadium. Note that the concept of the structure includes not only the building but also a non-building structure such as a tunnel, bridge, dam, fence, steel column, or a facility such as a crane, gate, or windmill. In addition, the concept of the structure includes not only a structure on land (on the ground) or under the ground but also a structure on the water such as a pier or megafloat, or a structure under the water such as an ocean observation facility. The base station device can be also referred to as a processing device or information processing device.

The base station device 20 may be a donor station or the relay node (relay station). Furthermore, the base station device 20 may be a fixed station or a mobile station. The mobile station is a radio communication device (e.g., the base station device) configured to be movable. At this time, the base station device 20 may be a device installed at the mobile body or the mobile body itself. For example, a relay node device having mobility can be regarded as the base station device 20 as the mobile station. In addition, a device, such as a vehicle, drone (aerial vehicle), or smartphone, that originally has mobility and has a function of the base station device (at least part of the function of the base station device) also corresponds to the base station device 20 as the mobile station.

Here, the mobile body may be a mobile terminal such as a smartphone or a mobile phone. Furthermore, the mobile body may be a mobile body (e.g., a vehicle such as an automobile, bicycle, bus, truck, motorcycle, train, or linear motor car) that moves on land (on the ground) or a mobile body (e.g., subway) that moves under the ground (e.g., in a tunnel).

Furthermore, the mobile body may be a mobile body (e.g., a ship such as a passenger ship, cargo ship, or hovercraft) that moves on the water or a mobile body (e.g., a submersible ship such as a submersible vessel, submarine boat, or unmanned submersible) that moves under water.

Still furthermore, the mobile body may be a mobile body (e.g., an aerial vehicle such as an airplane, airship, or drone) that moves in the atmosphere or a mobile body (e.g., an artificial celestial body such as an artificial satellite, spacecraft, space station, or probe vehicle) that moves above the atmosphere. The mobile body that moves above the atmosphere can be also referred to as a space vehicle.

Furthermore, the base station device 20 may be a ground base station device (ground station device) installed on the ground. For example, the base station device 20 may include a base station device arranged in a structure on the ground or a base station device installed in a mobile body moving on the ground. More specifically, the base station device 20 may include an antenna installed on a structure such as a building and a signal processing device connected to the antenna. As a matter of course, the base station device 20 may include the structure or the mobile body itself. "On the ground" represents not only on land (on the ground) but also under the ground, on the water, and under the water in a broad sense. Note that the base station device 20 is not limited to the ground base station device. The base station device 20 may be a non-terrestrial base station device (non-terrestrial station device) that is configured to float in the air or in space. For example, the base station device 20 may include an aircraft station device or a satellite station device.

The aircraft station device is a radio communication device, such as an aircraft, that is configured to float in the atmosphere (including the stratosphere). The aircraft station device may include a device mounted on an aircraft or the like or may be the aircraft itself. Note that the concept of the aircraft includes not only a heavier-than-air aircraft such as an airplane or glider, but also a lighter-than-air aircraft such as a balloon or airship. Furthermore, the concept of the aircraft includes not only the heavier-than-air aircraft or lighter-than-air aircraft, but also a rotorcraft such as a helicopter or autogyro. Note that the aircraft station device (or an aircraft on which the aircraft station device is mounted) may include an unmanned aircraft such as a drone (aerial vehicle). Note that, in a case where the aircraft station device functions as the user equipment (UE), the aircraft station device may be aerial UE.

Note that the concept of the unmanned aircraft also includes unmanned aircraft systems (UAS) or tethered UAS. Furthermore, the concept of the unmanned aircraft includes a lighter than air UAS (LTA) or a heavier than air UAS (HTA). In addition, the concept of the unmanned aircraft also includes high altitude UAS Platforms (HAPs).

The satellite station device is a radio communication device that is configured to float above the atmosphere. The satellite station device may be a device mounted on a space vehicle such as an artificial satellite or may be the space vehicle itself. A satellite serving as the satellite station device may be any of a low earth orbiting (LEO) satellite, medium earth orbiting (MEO) satellite, geostationary earth orbiting (GEO) satellite, and highly elliptical orbiting (HEO) satellite. As a matter of course, the satellite station device may be a device mounted on the low earth orbiting satellite, medium earth orbiting satellite, geostationary earth orbiting satellite, or highly elliptical orbiting satellite The base station device 20 may provide large coverage, such as a macrocell, or small coverage, such as a picocell. As a matter of course, the base station device 20 may provide extremely small coverage, such as a femtocell. Furthermore, the base station device 20 may have beamforming capability. In this case, in the base station device 20, a cell or service area may be formed for each beam.

The cell provided by the base station device 20 is referred to as a serving cell. The serving cell may include a primary cell (pCell) and a secondary cell (sCell). When dual connectivity is provided for UE (e.g., the terminal device 40), the pCell and the sCell(s) provided by a master node (MN) are referred to as a master cell group. Examples of the dual connectivity include EUTRA-EUTRA Dual Connectivity, EUTRA-NR Dual Connectivity (ENDC), EUTRA-NR Dual Connectivity with 5GC, NR-EUTRA Dual Connectivity (NEDC), and NR-NR Dual Connectivity.

Furthermore, the serving cell may include a primary secondary cell or primary SCG cell (PSCell). In other words, in a case where dual connectivity is provided for UE, the PSCell and the sCell(s) provided by a secondary node (SN) are referred to as a secondary cell group (SCG).

In one cell, one downlink component carrier and one uplink component carrier may be associated with each other. Furthermore, a system bandwidth corresponding to one cell may be divided into a plurality of bandwidth parts (BWPs). In this case, one or more BWPs may be configured for UE and one BWP may be used for the UE as an active BWP. In addition, radio resources (e.g., a frequency band, numerology (subcarrier spacing), and a slot configuration) that can be used by the terminal device 40 may be different for each cell, each component carrier, or each BWP. Furthermore, one base station device may provide a plurality of cells.

In the example of FIG. 5, the base station device $20_1$ is connected to the relay device $30_1$, and the base station device $20_2$ is connected to the relay device $30_2$. The base station device $20_1$ is configured to indirectly establish radio communication with the terminal device 40 via the relay device $30_1$. Similarly, the base station device $20_2$ is configured to indirectly establish radio communication with the terminal device 40 via the relay device $30_2$.

(Relay Device)

The relay device 30 is a device that serves as the relay station for the base station. The relay device 30 is a type of base station device. Furthermore, the relay device 30 is a type of information processing device. The relay device can be referred to as a relay base station device (or a relay base station).

The relay device 30 is configured to perform NOMA communication and the like with the terminal device 40. The relay device 30 relays communication between the base station device 20 and the terminal device 40. Note that the relay device 30 may be capable of radio communication with the other relay devices 30 and the base station device 20. The relay device 30 may be the ground station device or the non-terrestrial station device. The relay devices 30 constitute the radio access network RAN together with the base station devices 20.

Note that the relay device of the present embodiment may be a fixed device, a movable device, or a floatable device. Furthermore, the coverage of the relay device of the present embodiment is not limited to a specific size. For example, the cell covered by the relay device may be a macrocell, a microcell, or a small cell.

In addition, the relay device of the present embodiment does not limit a device to which the relay device is mounted, as long as a relay function is satisfied. For example, the relay may be mounted on a terminal device such as a smartphone, may be mounted on an automobile or a human-powered vehicle, may be mounted on a balloon, an airplane, or a drone, or may be mounted on a home appliance such as a TV set, a game machine, an air conditioner, a refrigerator, or a light device.

In addition, the configuration of the relay device 30 may be similar to the configuration of the base station device 20 described above. For example, the relay device 30 may be a device installed at the mobile body or the mobile body itself, as in the base station device 20 described above. As described above, the mobile body may be a mobile terminal such as a smartphone or a mobile phone. In addition, the mobile body may be a mobile body that moves on land (on the ground) or may be a mobile body that moves under the ground. As a matter of course, the mobile body may be a mobile body that moves on the water or may be a mobile body that moves under water. In addition, the mobile body may be a mobile body that moves in the atmosphere or may be a mobile body that moves above the atmosphere. Furthermore, the base station device 20 may be the ground station device or the non-terrestrial station device. For example, the relay device 30 may be the aircraft station device or the satellite station device.

Furthermore, the relay device 30 may provide a large coverage such as a macrocell or small coverage such as a picocell, as in the base station device 20. As a matter of course, the relay device 30 may provide extremely small coverage, such as a femtocell. Furthermore, the relay device 30 may have beamforming capability. In this case, in the relay device 30, a cell or service area may be formed for each beam.

In addition, the configuration of the relay device 30 may be similar to the configuration of the base station device 20 described above.

(Terminal Device)

The terminal device 40 is a radio communication device that performs radio communication with the base station device 20 or the relay device 30. The terminal device 40 is, for example, a mobile phone, a smart device (smartphone or tablet), a personal digital assistant (PDA), or a personal computer. Furthermore, the terminal device 40 may be a device such as a business camera provided with a communication function, or may be a motorcycle, a moving relay vehicle, or the like on which a communication device such as a field pickup unit (FPU) is mounted. Furthermore, the terminal device 40 may be a machine to machine (M2M) device or an Internet of Things (IoT) device. The terminal device 40 may be referred to as, for example, MTC UE, NB-IoT UE, or Cat.M UE. Furthermore, the terminal device may be referred to as a mobile station (MS) or a wireless transmission reception unit (WTRU).

Furthermore, the terminal device 40 may be configured to perform sidelink communication with another terminal device 40. The terminal device 40 may be configured to use an automatic retransmission technology such as HARQ when performing sidelink communication. The terminal device 40 may be configured to perform NOMA communication with the base station device 20 and the relay device 30. Note that the terminal device 40 may be configured to perform NOMA communication also in communication (sidelink) with another terminal device 40. Furthermore, the terminal device 40 may be configured to perform LPWA communication with another communication device (e.g., the base station device 20, the relay device 30, and another terminal device 40). In addition, radio communication used by the terminal device 40 may be millimeter wave radio communication. Note that radio communication (including sidelink communication) used by the terminal device 40 may be radio communication using radio waves or radio communication using infrared or visible light (optical radio communication).

Furthermore, the terminal device 40 may be a mobile device. Here, the mobile device is a movable radio communication device. Furthermore, the terminal device 40 may be a radio communication device installed in the mobile body or the mobile body itself. For example, the terminal device 40 may be a vehicle that moves on a road, such as an automobile, bus, truck, or motorcycle, or a radio communication device mounted on the vehicle. Note that the mobile body may be a mobile terminal, or may be a mobile body that moves on land (on the ground), under the ground, on the water, or under the water. Furthermore, the mobile body may be a mobile body that moves in the atmosphere, such as a drone (aerial UE) or a helicopter, or may be a mobile body that moves above the atmosphere, such as an artificial satellite.

The terminal device 40 may be simultaneously connected to a plurality of base station devices or a plurality of cells to perform communication. For example, in a case where one base station device is configured to provide a plurality of cells, the terminal device 40 is allowed to perform carrier aggregation by using one cell as the pCell and using another cell as the sCell. Furthermore, in a case where each of a plurality of base station devices 20 is configured to provide one or more cells, the terminal device 40 uses one or more cells managed by one base station device (MN (e.g., MeNB or MgNB)) as the pCell, or the pCell and the sCell(s), and uses one or more cells managed by the other base station device (Sn (e.g., SeNB or SgNB)) as the pCell, or the pCell and the sCell(s), thereby achieving dual connectivity (DC). DC may be referred to as multi connectivity (MC).

Note that, in a case where a communication area is supported via cells of different base station devices 20 (a plurality of cells having different cell identifiers or identical cell identifier), it is possible to combine the plurality of cells by a carrier aggregation (CA) technology, a dual connectivity (DC) technology, or a multi-connectivity (MC) technology to perform communication between the base station devices 20 and the terminal device 40. Alternatively, it is also possible for the terminal device 40 and the plurality of base station devices 20 to perform communication with each other via the cells of the different base station devices 20 by using a coordinated transmission and reception (CoMP: coordinated multi-point transmission and reception) technology.

Note that the terminal device 40 is not necessarily a device directly used by a person. The terminal device 40 may be a sensor installed in a machine or the like in a factory, as in so-called machine type communication (MTC). Furthermore, the terminal device 40 may be a machine to machine (M2M) device or an Internet of Things (IoT) device. Furthermore, the terminal device 40 may be a device having a relay communication function, as represented by device to device (D2D) or vehicle to everything (V2X). Furthermore, the terminal device 40 may be a device called client premises equipment (CPE) used for radio backhaul or the like.

Hereinafter, the configurations of respective devices constituting the communication system 1 according to the embodiment will be specifically described. Note that the configurations of the devices described below are merely examples. The configurations of the devices may be different from the following configurations.

<2-2. Configuration of Management Device>

Figure 6:
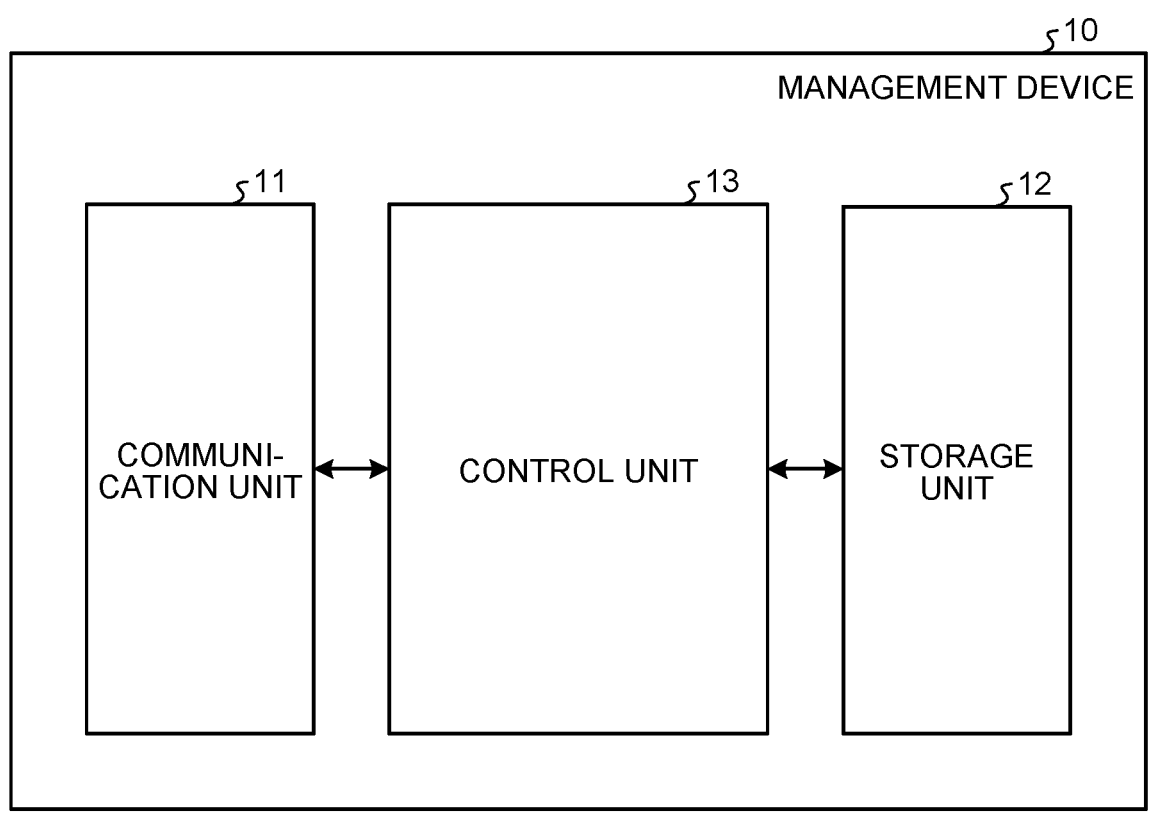
FIG. 6 is a diagram illustrating a configuration example of a management device according to an embodiment of the present disclosure.

FIG. 6 is a diagram illustrating a configuration example of the management device 10 according to an embodiment of the present disclosure. The management device 10 is a device that manages the radio network. The management device 10 includes a communication unit 11, a storage unit 12, and a control unit 13. Note that the configuration illustrated in FIG. 6 represents a functional configuration, and the management device 10 may have a hardware configuration different from the functional configuration. Furthermore, the functions of the management device 10 may be distributed and implemented in a plurality of physically separated configurations. For example, the management device 10 may be constituted by a plurality of server devices.

The communication unit 11 is a communication interface for communicating with another device. The communication unit 11 may be a network interface or a device connection interface. For example, the communication unit 11 may include a local area network (LAN) interface such as a network interface card (NIC) or may include a universal serial bus (USB) interface including a USB host controller, a USB port, and the like. Furthermore, the communication unit 11 may be a wired interface or a wireless interface. The communication unit 11 functions as communication means for the management device 10. The communication unit 11 communicates with the base station device 20 according to the control of the control unit 13.

The storage unit 12 is a data readable/writable storage device such as a dynamic random access memory (DRAM), static random access memory (SRAM), flash memory, or hard disk. The storage unit 12 functions as storage means for the management device 10. The storage unit 12 stores, for example, a connection state of the terminal device 40. For example, the storage unit 12 stores states of radio resource control (RRC) and EPS connection management (ECM) of the terminal device 40. The storage unit 12 may function as a home memory that stores position information indicating the positions of the terminal devices 40.

The control unit 13 is a controller that controls each unit of the management device 10. The control unit 13 is implemented by a processor such as a central processing unit (CPU) or a micro processing unit (MPU). For example, the control unit 13 is implemented in such a manner that the processor executes various programs stored in a storage device inside the management device 10 by using a random access memory (RAM) or the like as a work area. Note that the control unit 13 may be implemented by an integrated circuit such as an application specific integrated circuit (ASIC) or a field programmable gate array (FPGA). The CPU, MPU, ASIC, and FPGA can all be regarded as controllers.

<2-3. Configuration of Base Station Device>

Figure 7:
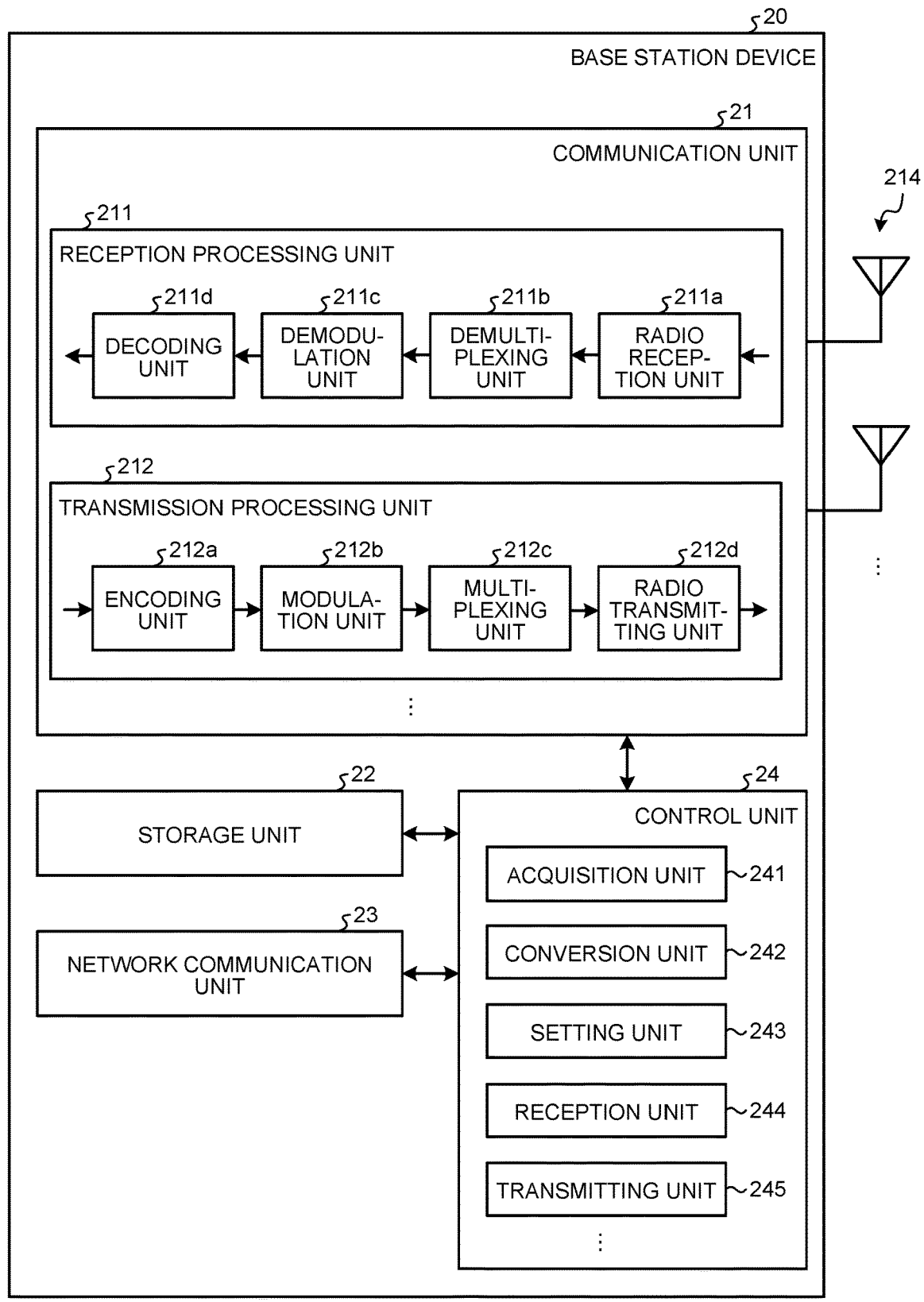
FIG. 7 is a diagram illustrating a configuration example of a base station device according to an embodiment of the present disclosure.

Next, the configuration of the base station device 20 will be described. FIG. 7 is a diagram illustrating a configuration example of the base station device 20 according to an embodiment of the present disclosure. The base station device 20 is configured to simultaneously perform data transmission and data reception by using the same band. For example, the base station device 20 is configured to perform in-band full-duplex communication with other radio communication devices such as the terminal device 40 and the relay device 30. The base station device 20 may be configured to perform NOMA communication with the other radio communication devices.

The base station device 20 includes a communication unit 21, a storage unit 22, a network communication unit 23, and a control unit 24. Note that the configuration illustrated in FIG. 7 represents a functional configuration, and the base station device 20 may have a hardware configuration different from the functional configuration. Furthermore, the functions of the base station device 20 may be distributed and implemented in a plurality of physically separated configurations.

The communication unit 21 is a signal processing unit for radio communication with other radio communication devices (e.g., the terminal device 40, the relay device 30, and another base station device 20). The communication unit 21 is configured to simultaneously perform data transmission and data reception by using the same band. For example, the base station device 20 is configured to perform in-band full-duplex communication with other communication devices such as the terminal device 40 and the relay device 30. The communication unit 21 operates according to the control of the control unit 24. The communication unit 21 supports one or more radio access methods. For example, the communication unit 21 supports both of NR and LTE. The communication unit 21 may support W-CDMA or cdma2000 in addition to NR and LTE. Furthermore, the communication unit 21 may support communication using NOMA.

The communication unit 21 includes a reception processing unit 211, a transmission processing unit 212, and an antenna 214. The communication unit 21 may include a plurality of reception processing units 211, transmission processing units 212, and antennas 214. Note that when the communication unit 21 supports a plurality of radio access methods, each unit of the communication unit 21 can be configured for each individual radio access method. For example, the reception processing unit 211 and the transmission processing unit 212 may be configured for each of LTE and NR.

The reception processing unit 211 performs processing for an uplink signal received via the antenna 214. The reception processing unit 211 includes a radio reception unit 211a, a demultiplexing unit 211b, a demodulation unit 211c, and a decoding unit 211d.

The radio reception unit 211a performs, on the uplink signal, down-convert, removal of an unnecessary frequency component, control of an amplification level, quadrature demodulation, conversion to a digital signal, removal of a guard interval (cyclic prefix), extraction of a frequency domain signal by fast Fourier transform, or the like. The demultiplexing unit 211b demultiplexes an uplink reference signal and an uplink channel such as physical uplink shared channel (PUSCH) and physical uplink control channel (PUCCH), from a signal output from the radio reception unit 211a. The demodulation unit 211c performs demodulation of a received signal by using a modulation method such as binary phase shift keying (BPSK) or quadrature phase shift keying (QPSK), on a modulation symbol from the uplink channel. The modulation method used by the demodulation unit 211c may include 16 quadrature amplitude modulation (16QAM), 64QAM, or 256QAM. In this configuration, constellation points in a constellation do not necessarily need to be equidistant. The constellation may be a non-uniform constellation (NUC). The decoding unit 211d performs decoding processing on a demodulated, encoded bits from the uplink channel. Decoded uplink data and uplink control information are output to the control unit 24.

The transmission processing unit 212 performs transmission process for downlink control information and downlink data. The transmission processing unit 212 includes an encoding unit 212a, a modulation unit 212b, a multiplexing unit 212c, and a radio transmitting unit 212d.

The encoding unit 212a performs encoding of the downlink control information and the downlink data that are input from the control unit 24, by using an encoding method such as block coding, convolutional coding, or turbo coding. Note that the encoding unit 212a may perform encoding with a polar code and encoding with a low density parity check code (LDPC code). The modulation unit 212b modulates encoded bits output from the encoding unit 212a by using a predetermined modulation method such as BPSK, QPSK, 16QAM, 64QAM, or 256QAM. In this configuration, constellation points in a constellation do not necessarily need to be equidistant. The constellation may be the non-uniform constellation. The multiplexing unit 212c multiplexes a modulation symbol and a downlink reference signal from each channel so as to be arranged in a predetermined resource element. The radio transmitting unit 212d performs various types of signal processing on the signal from the multiplexing unit 212c. For example, the radio transmitting unit 212d performs processing, such as conversion to a time domain by using fast Fourier transform, addition of the guard interval (cyclic prefix), generation of a baseband digital signal, conversion to an analog signal, quadrature modulation, up-convert, removal of an unnecessary frequency component, or amplification of power. A signal generated by the transmission processing unit 212 is transmitted from the antenna 214.

The storage unit 22 is a data readable/writable storage device such as a DRAM, SRAM, flash memory, or hard disk. The storage unit 22 functions as the storage means for the base station device 20.

The network communication unit 23 is a communication interface for communication with an upper node in the network (e.g., the management device 10). For example, the network communication unit 23 includes a LAN interface such as NIC. The network communication unit 23 may be a wired interface or a wireless interface. The network communication unit 23 functions as network communication means for the base station device 20.

The control unit 24 is a controller that controls each unit of the base station device 20. The control unit 24 is implemented by a processor (hardware processor) such as a central processing unit (CPU) or a micro processing unit (MPU). For example, the control unit 24 is implemented in such a manner that the processor executes various programs stored in a storage device inside the base station device 20 by using a random access memory (RAM) or the like as a work area. In addition, the control unit 24 may be implemented by an integrated circuit such as an application specific integrated circuit (ASIC) or a field programmable gate array (FPGA). The CPU, MPU, ASIC, and FPGA can all be regarded as controllers.

As illustrated in FIG. 7, the control unit 24 includes an acquisition unit 241, a conversion unit 242, a setting unit 243, a reception unit 244, and a transmitting unit 245. The blocks (the acquisition unit 241 to the transmitting unit 245) constituting the control unit 24 are functional blocks indicating functions of the control unit 24. These functional blocks may be software blocks or hardware blocks. For example, each of the functional blocks described above may be one software module implemented by software (including a microprogram) or one circuit block on a semiconductor chip (die). As a matter of course, each functional block may be one processor or one integrated circuit. Any configuration method is employed for the functional blocks.

Note that the control unit 24 may be constituted by functional units different from the above functional blocks. Note that the operations of the blocks (the acquisition unit 241 to the transmitting unit 245) constituting the control unit 24 may be similar to the operations of the blocks constituting the control unit of the relay device 30. The configuration of the relay device 30 will be described later. The operations of the blocks (the acquisition unit 241 to the transmitting unit 245) constituting the control unit 24 may be similar to the operations of the blocks constituting the control unit of the terminal device 40. The configuration of the terminal device 40 will be described later.

<2-4. Configuration of Relay Device>

Figure 8:
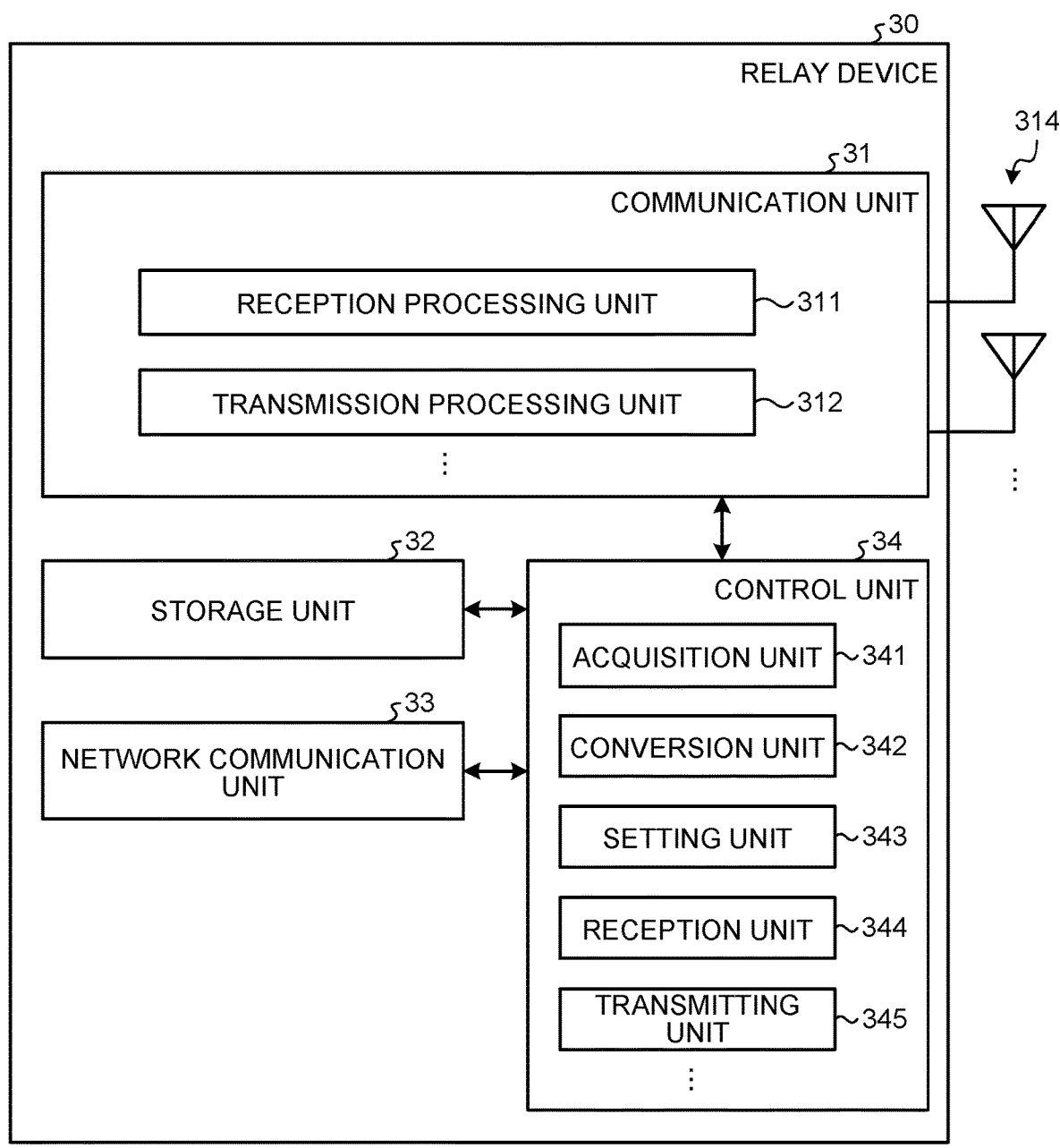
FIG. 8 is a diagram illustrating a configuration example of a relay device according to an embodiment of the present disclosure.

Next, the configuration of the relay device 30 will be described. FIG. 8 is a diagram illustrating a configuration example of the relay device 30 according to an embodiment of the present disclosure. The relay device 30 is configured to simultaneously perform data transmission and data reception by using the same band. For example, the relay device 30 is configured to perform in-band full-duplex communication with other radio communication devices such as the terminal device 40 and the relay device 30. The relay device 30 may be configured to perform NOMA communication with the other radio communication devices.

The relay device 30 includes a communication unit 31, a storage unit 32, a network communication unit 33, and a control unit 34. Note that the configuration illustrated in FIG. 8 represents a functional configuration, and the relay device 30 may have a hardware configuration different from the functional configuration. Furthermore, the functions of the relay device 30 may be distributed and implemented in a plurality of physically separated configurations.

The communication unit 31 is a signal processing unit for radio communication with other radio communication devices (e.g., the base station device 20, the terminal device 40, and another relay device 30). The communication unit 31 is configured to simultaneously perform data transmission and data reception by using the same band. For example, the communication unit 31 is configured to perform in-band full-duplex communication with other communication devices such as the base station device 20 and the terminal device 40. The communication unit 31 operates according to the control of the control unit 34. The communication unit 31 supports one or more radio access methods. For example, the communication unit 41 supports both of NR and LTE. The communication unit 31 may support W-CDMA or cdma2000 in addition to NR and LTE. Furthermore, the communication unit 31 may support communication using NOMA.

The communication unit 31 includes a reception processing unit 311, a transmission processing unit 312, and an antenna 314. The communication unit 31 may include a plurality of reception processing units 311, transmission processing units 312, and antennas 314. The configurations of the communication unit 31, the reception processing unit 311, the transmission processing unit 312, and the antenna 314 are similar to those of the communication unit 21, the reception processing unit 211, the transmission processing unit 212, and the antenna 214 of the base station device 20.

The storage unit 32 is a data readable/writable storage device such as a DRAM, SRAM, flash memory, or hard disk. The storage unit 32 functions as the storage means for the relay device 30. The configuration of the storage unit 32 is similar to that of the storage unit 22 of the base station device 20.

The network communication unit 33 is a communication interface for communication with an upper node in the network. For example, the network communication unit 33 includes a LAN interface such as NIC. The network communication unit 33 may be a wired interface or a wireless interface. The network communication unit 33 functions as the network communication means for the relay device 30. The network communication unit 33 communicates with the base station device 20 according to the control of the control unit 34.

The control unit 34 is a controller that controls each unit of the relay device 30. The control unit 34 is implemented by, for example, a processor (hardware processor) such as a CPU or an MPU. For example, the control unit 34 is implemented in such a manner that the processor executes various programs stored in a storage device inside the relay device 30 by using RAM or the like as a work area. The control unit 34 may be implemented by an integrated circuit such as ASIC or FPGA. The CPU, MPU, ASIC, and FPGA can all be regarded as controllers.

As illustrated in FIG. 8, the control unit 34 includes an acquisition unit 341, a conversion unit 342, a setting unit 343, a reception unit 344, and a transmitting unit 345. The blocks (the acquisition unit 341 to the transmitting unit 345) constituting the control unit 34 are functional blocks indicating functions of the control unit 34. These functional blocks may be software blocks or hardware blocks. For example, each of the functional blocks described above may be one software module implemented by software (including a microprogram) or one circuit block on a semiconductor chip (die). As a matter of course, each functional block may be one processor or one integrated circuit. Any configuration method is employed for the functional blocks.

Note that the control unit 34 may be constituted by functional units different from the above functional blocks. Note that the operations of the blocks (the acquisition unit 341 to the transmitting unit 345) constituting the control unit 34 may be similar to the operations of the blocks (the acquisition unit 241 to the transmitting unit 245) constituting the control unit 24 of the base station device 20. The operations of the blocks (the acquisition unit 341 to the transmitting unit 345) constituting the control unit 34 may be similar to the operations of the blocks constituting the control unit of the terminal device 40. The configuration of the terminal device 40 will be described later.

<2-5. Configuration of Terminal Device>

Figure 9:
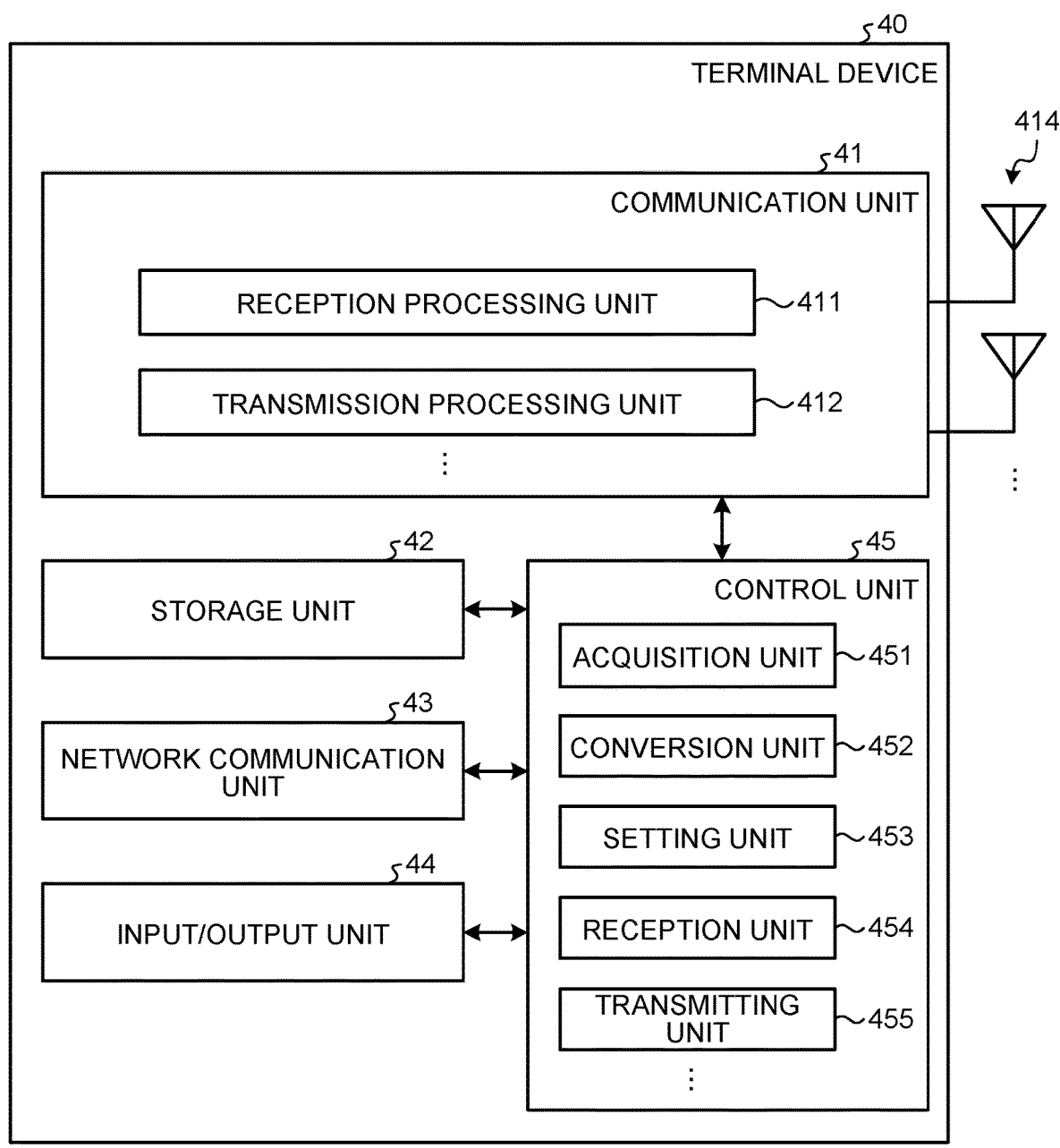
FIG. 9 is a diagram illustrating a configuration example of a terminal device according to an embodiment of the present disclosure.

Next, the configuration of the terminal device 40 will be described. FIG. 9 is a diagram illustrating a configuration example of the terminal device 40 according to an embodiment of the present disclosure. The terminal device 40 is configured to simultaneously perform data transmission and data reception by using the same band. For example, the terminal device 40 is configured to perform in-band full-duplex communication with other radio communication devices such as the base station device 20 and the relay device 30. The terminal device 40 may be configured to perform NOMA communication with the other radio communication devices.

The terminal device 40 includes a communication unit 41, a storage unit 42, a network communication unit 43, an input/output unit 44, and a control unit 45. Note that the configuration illustrated in FIG. 9 represents a functional configuration, and the terminal device 40 may have a hardware configuration different from the functional configuration. Furthermore, the functions of the terminal device 40 may be distributed and implemented in a plurality of physically separated configurations. Note that, in the configuration of the terminal device 40, the network communication unit 43 and the input/output unit 44 may not be essential components.

The communication unit 41 is a signal processing unit for radio communication with other radio communication devices (e.g., the base station device 20, the relay device 30, and another terminal device 40). The communication unit 41 is configured to simultaneously perform data transmission and data reception by using the same band. For example, the communication unit 31 is configured to perform in-band full-duplex communication with other communication devices such as the base station device 20 and the terminal device 40. The communication unit 41 operates according to the control of the control unit 45. The communication unit 41 supports one or more radio access methods. For example, the communication unit 41 supports both of NR and LTE. The communication unit 41 may support W-CDMA or cdma2000 in addition to NR and LTE. Furthermore, the communication unit 41 may support communication using NOMA.

The communication unit 41 includes a reception processing unit 411, a transmission processing unit 412, and an antenna 414. The communication unit 41 may include a plurality of reception processing units 411, transmission processing units 412, and antennas 414. The configurations of the communication unit 41, the reception processing unit 411, the transmission processing unit 412, and the antenna 414 are similar to those of the communication unit 21, the reception processing unit 211, the transmission processing unit 212, and the antenna 214 of the base station device 20.

The storage unit 42 is a data readable/writable storage device such as a DRAM, SRAM, flash memory, or hard disk. The storage unit 42 functions as the storage means for the terminal device 40. The storage unit 42 stores "information about transmission from an unconnected state (unconnected transmission information)" acquired from the base station device 20. The "information about transmission from an unconnected state (unconnected transmission information)" will be described in detail later.

The network communication unit 43 is a communication interface for communication with an upper node in the network. For example, the network communication unit 43 includes a LAN interface such as NIC. The network communication unit 43 may be a wired interface or a wireless interface. The network communication unit 43 functions as the network communication means for the terminal device 40. The network communication unit 43 communicates with another device according to the control of the control unit 45.

The input/output unit 44 is a user interface for exchanging information with the user. For example, the input/output unit 44 is an operation device, such as a keyboard, mouse, operation keys, or touch panel, through which various operations are performed by the user. Alternately, the input/output unit 44 is a display device such as a liquid crystal display or organic electroluminescence (EL) display. The input/output unit 44 may be an acoustic device such as a speaker or buzzer. The input/output unit 44 may be a lighting device such as a light emitting diode (LED) lamp. The input/output unit 44 functions as input/output means (input means, output means, operation means, or notification means) of the terminal device 40.

The control unit 45 is a controller that controls each unit of the terminal device 40. The control unit 45 is implemented by, for example, a processor (hardware processor) such as a CPU or an MPU. For example, the control unit 45 is implemented in such a manner that the processor executes various programs stored in a storage device inside the terminal device 40 by using RAM or the like as a work area. The control unit 45 may be implemented by an integrated circuit such as ASIC or FPGA. The CPU, MPU, ASIC, and FPGA can all be regarded as controllers.

As illustrated in FIG. 9, the control unit 45 includes an acquisition unit 451, a conversion unit 452, a setting unit 453, a reception unit 454, and a transmitting unit 455. The blocks (the acquisition unit 451 to the transmitting unit 455) constituting the control unit 45 are functional blocks indicating functions of the control unit 45. These functional blocks may be software blocks or hardware blocks. For example, each of the functional blocks described above may be one software module implemented by software (including a microprogram) or one circuit block on a semiconductor chip (die). As a matter of course, each functional block may be one processor or one integrated circuit. Any configuration method is employed for the functional blocks.

Note that the control unit 45 may be constituted by functional units different from the above functional blocks. Note that the operations of the blocks (the acquisition unit 451 to the transmitting unit 455) constituting the control unit 45 may be similar to the operations of the blocks (the acquisition unit 241 to the transmitting unit 245) constituting the control unit 24 of the base station device 20. The operations of the blocks (the acquisition unit 451 to the transmitting unit 455) constituting the control unit 34 may be similar to the operations of the blocks (the acquisition unit 341 to the transmitting unit 345) constituting the control unit of the relay device 30.

3. OPERATIONS OF COMMUNICATION SYSTEM

The configuration of the communication system 1 has been described above. Next, the operations of the communication system 1 will be described.

<3-1. Signal Constellation Including Non-Power of Two Number of Complex Constellation Points>

Before describing the operations of the communication system 1, the signal constellation including a non-power of two number of complex constellation points will be described. As described above, a non-power of two (non-$2^n$) is a number that is not a power of two (=$2^1$, $2^2$, $2^3$, $2^4$, $2^5$, $2^6$, ...).

As described above, for conversion into the conventional complex constellation point sequence, the complex signal constellation (constellation) has been used such as M-PSK, M-QAM, or the like having a relationship where M=$2^m$, such as BPSK (2PSK), QPSK (4PSK), 16QAM, 64QAM, or 256QAM. Meanwhile, in the present embodiment, when the bit sequence is converted to the complex constellation point sequence, the complex signal constellation having a relationship of M≠$2^m$ is used.

(Example of Complex Signal Constellation)

Figure 10:
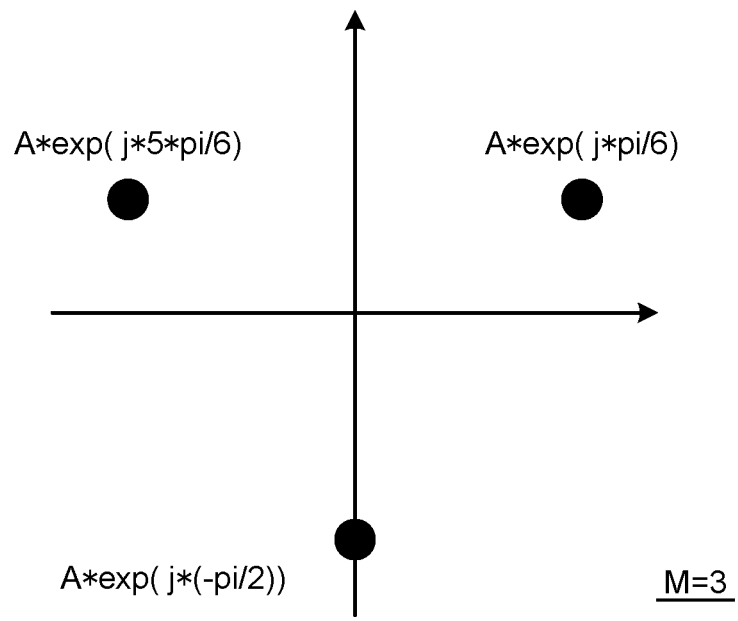
FIG. 10 is a diagram illustrating an example of 3PSK (M=3).
Figure 11:
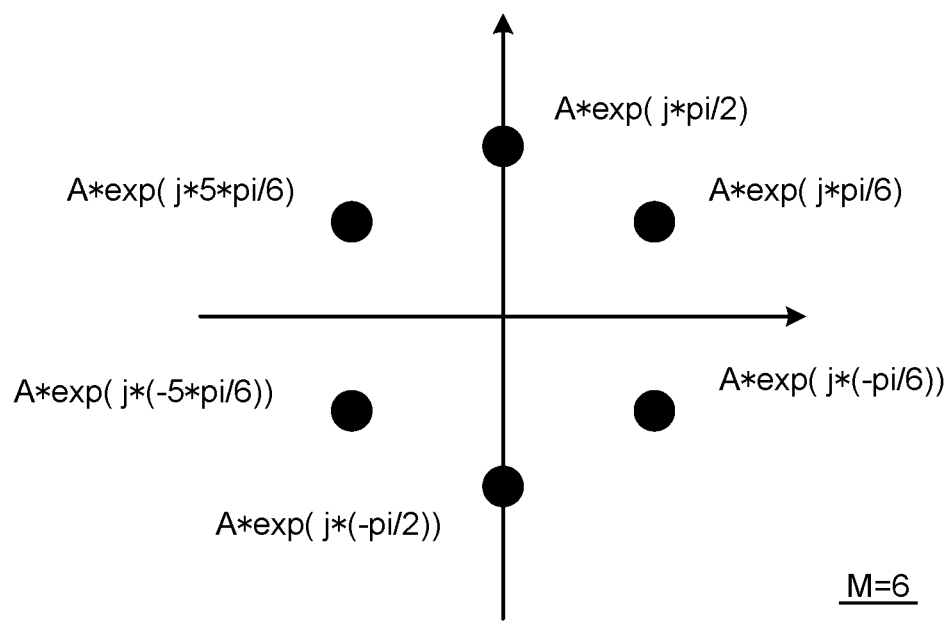
FIG. 11 is a diagram illustrating an example of 6PSK (M=6).

As an example, consider PSK where M≠$2^m$. FIG. 10 is a diagram illustrating an example of 3PSK (M=3). Furthermore, FIG. 11 is a diagram illustrating an example of 6PSK (M=6). In the drawings, A represents the amplitude of the complex constellation point (A is a real number). When PSK where M≠$2^m$ is used, it is desirable that the amplitudes of the complex constellation points may be equal to each other as illustrated in the drawings. Note that when it is considered that the constellation includes zero (zero complex constellation point), the amplitudes of non-zero signal points (non-zero complex constellation points) are desirably equal to each other. In addition, desirably, the phase intervals of the non-zero complex constellation points are also equal. For example, a phase difference is desirably an integral multiple of 2π/M. These conditions are necessary to keep the distance between constellation points or the distance between codes as large as possible. For example, in the example of FIG. 10, the phase difference is an integral multiple of 2π/3. In the example of FIG. 11, the phase difference is an integral multiple of 2π/4.

Furthermore, complex signal constellations of different PSKs as illustrated in FIGS. 10 and 11 desirably have an average power of constant value $A^2$. In a case where PSKs having only the non-zero complex constellation points satisfy this condition, each point desirably has an amplitude of A, as illustrated in FIGS. 10 and 11. In a case where M+1 complex constellation points including zero (0+j0) are considered, it is desirable to normalize the amplitude of each point to satisfy the following formula (1).

$$A' = \sqrt{\frac{M+1}{M}} A \tag{1}$$

(Another Example of Complex Signal Constellation)

Figure 12:
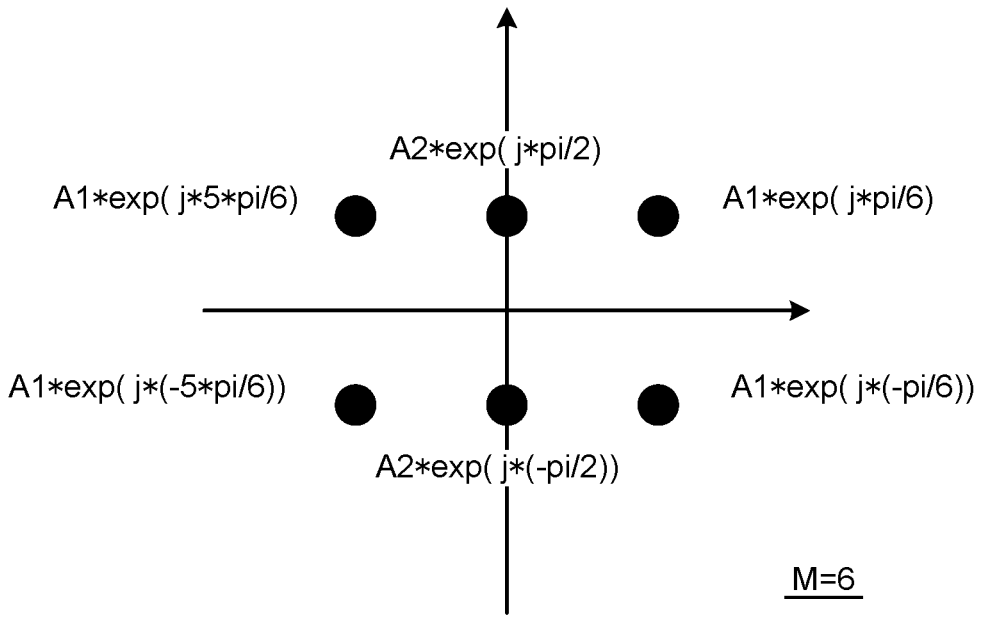
FIG. 12 is a diagram illustrating an example of 6QAM (M=6).
Figure 13:
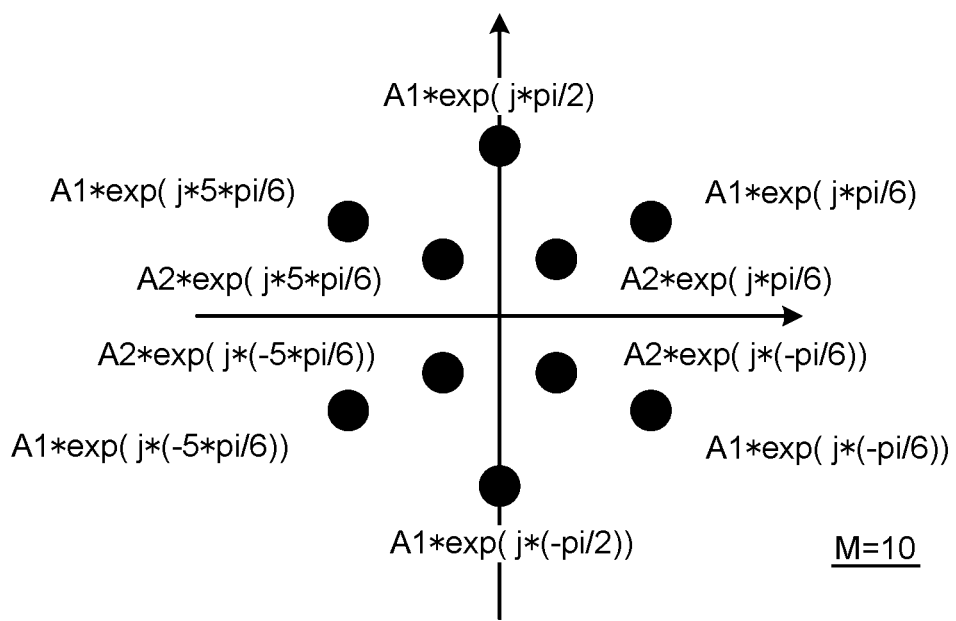
FIG. 13 is a diagram illustrating an example of 10QAM (M=10).

As another example, consider QAM where M≠$2^m$. FIG. 12 is a diagram illustrating an example of 6QAM (M=6). FIG. 13 is a diagram illustrating an example of 10QAM (M=10). In the drawings, $A_1$, $A_2$, and the like are the amplitudes (real numbers) of the complex constellation points. When QAM where M≠$2^m$ is used, it is desirable that the amplitudes of the complex constellation points may be equal at least at two constellation points, for example, as illustrated in FIGS. 12 and 13. Furthermore, a value of each amplitude at a constellation point including Z (Z<M) amplitudes, such as $A_1$, $A_2$, . . . , and $A_z$, desirably satisfies the following conditions.

For example, the number of constellation points having an amplitude $A_1$ is $M_1$, the number of constellation points having an amplitude $A_2$ is $M_2$, . . . , and the number of constellation points having an amplitude $A_z$ is $M_z$ (the following formula (2)).

$$\sum_{z=1}^{Z} M_z = M (\neq 2^m) \tag{2}$$

In addition, $A_z = \alpha_z A_1$ on the basis of $A_1$ ($\alpha_z$ is a real number, and $\alpha_1 = 1$). Under such an assumption, the value of $\alpha_z$ is determined so that the signal constellations have an average power of constant value $A^2$. In other words, when the signal constellation does not include zero, the value of $\alpha_z$ is determined so as to satisfy a relationship indicated by the formula (3).

$$\frac{1}{M}\sum_{z=1}^{Z} M_z A_z^2 = \frac{1}{M}\sum_{z=1}^{Z} M_z (\alpha_z A_1)^2 = A^2 \tag{3}$$

For example, in FIG. 12, when M=6, $M_1=4$, $M_2=2$, and $A^2=1$, $\alpha_2$ and $A_2$ are desirably determined so as to satisfy the following formula (4).

$$\frac{1}{6}(4 + 2\alpha_2^2)A_1^2 = 1 \tag{4}$$

-continued $$\alpha_2 = \sqrt{\frac{3}{A_1^2} - 2}$$

Likewise, in FIG. 13, when M=10, $M_1$=6, $M_2$=4, and A=1, $\alpha_2$ and $A_2$ are desirably determined so as to satisfy the following formula (5).

$$\frac{1}{10}(6 + 4\alpha_2^2)A_1^2 = 1 \qquad (5)$$

$$\alpha_2 = \sqrt{\frac{5}{2A_1^2} - \frac{3}{2}}$$

When the signal constellation includes zero, it is desirable to determine the values by replacing M with M+1 in the above conditions.

Here, it should be noted that the signal constellation including M≠$2^m$ complex constellation points cannot support (or is inefficient for) mapping to only one resource element. In other words, it can be said that the signal constellation including M≠$2^m$ complex constellation points can have effect by being combined with the index modulation (IM) as in the present embodiment.

When a combination with IM is considered, all M≠$2^m$ constellation points are desirably non-zero. This is because a zero constellation point (null constellation point) as the IM is separately prepared. In addition to the method of separately preparing M≠$2^m$ non-zero complex signal constellations and the zero constellation point, it can be said that a signal constellation having M+1 elements including M≠$2^m$ non-zero complex constellation points and zero constellation point may be used. When M+1 complex constellation points are considered including zero (0+j0), it is desirable to normalize the amplitude of each point in consideration of zero.

<3-2. Number of Bits to be Carried>

Next, the number of bits to be carried for the number of combinations of the index modulations (IMs) by a technology proposed in the present embodiment will be described.

First Example

As an example, the index modulation (IM) for N resource elements by the communication device (e.g., the base station device 20 or the terminal device 40) will be considered. In the first example, the communication device maps the complex constellation points to K (≤N) resource elements, and maps any complex constellation point of the complex constellation points of the complex signal constellation including M≠$2^m$ non-zero complex constellation points, to each of the K resource elements. In this configuration, the number $N_B$ of bits to be carried on the N resource elements can be obtained according to the following formula (6).

$$N_B = \text{floor}\left[\log_2\{M^K C\}\right] \qquad (6)$$

$$C = \binom{N}{K}$$

Here, floor(x) means rounding down (the largest integer equal to or less than x). In addition, the right side (parenthesized N and K) of a lower equation of the formula (6) means the number of combinations of K resource elements that is selected from N resource elements without overlapping. This equation can also be expressed as the following formula (7).

$$\binom{N}{K} = {}_NC_K \qquad (7)$$

In the conventional IM, where M=$2^m$, $N_B$ can be rewritten as the following formula (8).

$$N_B = mK + \text{floor}\{\log_2(C)\} \qquad (8)$$

Formula (8) means that when the value of the number C of the combinations satisfies C≠$2^n$ (n is a positive integer), logarithmic conversion and rounding down cause an unnecessary combination that does not contribute to an increase in the number of bits to be carried. The technology proposed of the present embodiment suppresses the occurrence of this unnecessary combination as much as possible.

For example, in the present embodiment, the parenthesized value of the logarithm ($\log_2$) of formula (6) is brought closer to a power of two as much as possible to suppress the occurrence of the unnecessary combination. Specifically, the information processing device selects variables M, m, K, and N so as to satisfy a condition expressed by the following formula (9), for any integers p and q.

$$\min(|2^p - M^K C|) \leq \min(|2^q - C|), p\forall, q\forall \qquad (9)$$

Note that the information processing device that performs the above selection (selection of the variables M, m, K, and N) may be the base station device 20, the relay device 30, or the terminal device 40. As a matter of course, the device that performs the above selection may be another device (e.g., the management device 10).

Selecting variables in this manner makes it possible to minimize waste caused by a relationship between the number of combination candidates and the number of complex constellation point candidates.

FIG. 14 is a diagram illustrating resource element selection candidates. Specifically, FIG. 14 illustrates an example of the resource element selection candidates where N=4 and K=2. In the example of FIG. 14, the number of combinations of the resource elements is six. The six is not a power of two ($2^n$), the number of bits to be carried on the number of combinations of the resource elements in the conventional IM is 2 bits (i.e., only four of the six combinations are used), and two combinations are wasted.

Figure 15:
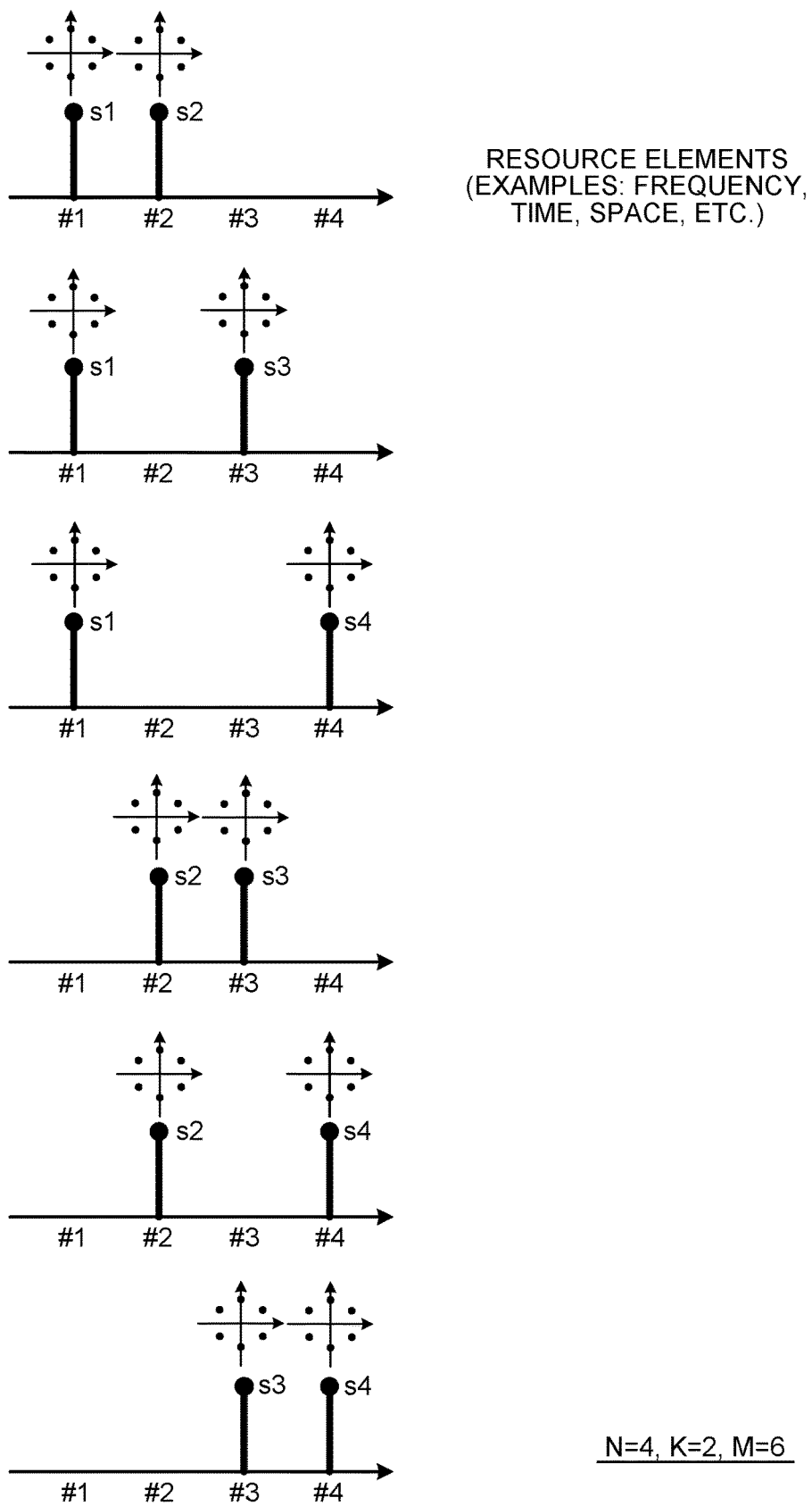
FIG. 15 is a diagram illustrating an example of using a complex signal constellation including a non-power of two number of complex constellation points.

FIG. 15 is a diagram illustrating an example of using the complex signal constellation including the non-power of two number of complex constellation points. Specifically, FIG. 15 illustrates an example of the resource element selection candidates, where N=4, K=2, and M=6 (in the following drawings, depiction of the complex signal constellation is omitted). In the present embodiment, the complex signal constellation including the non-$2^m$ complex constellation points is used to determine the number of bits, on the basis of a value obtained by multiplication of the number of resource element combination candidates by the number of complex constellation point candidates. Appropriate values are set to the number of resource element combination candidates and the number of complex constellation point candidates, and it is possible to reduce waste.

Second Example

Next, another example (second example) of the present embodiment will be described.

In the second example as well, the index modulation (IM) for N resource elements by the communication device (e.g., the base station device 20 or the terminal device 40) is performed. In the second example, the communication device maps the complex constellation points to $K_1$ ($\leq N$) resource elements, and maps any complex constellation point of the complex signal constellation including $M_1 \neq 2^{n_1}$ non-zero complex constellation points, to each of the $K_1$ resource elements. In addition, the communication device maps the complex constellation points to the other $K_2$ ($\leq N-K_1$) resource elements that are not selected as the $K_1$ resource elements, and maps any complex constellation point of the complex signal constellation including $M_2 \neq 2^{n_2}$ non-zero complex constellation points, to each of the $K_2$ resource elements.

In this configuration, the number $N_B$ of bits to be carried on the N resource elements can be obtained according to the following formula (10).

$$N_B = \text{floor}\left[\log_2\{M_1^{K_1} M_1^{K_2} C\}\right] \tag{10}$$

$$C = \binom{N}{K_1}\binom{N-K_1}{K_2}$$

FIG. 16 is a diagram illustrating the resource element selection candidates. Specifically, FIG. 16 illustrates an example of the resource element selection candidates where N=4, $K_1$=1, and $K_2$=1. In the drawing, a difference between a solid line and a broken line means a difference between complex signal constellations. In the example of FIG. 16, the number C of combination candidates of resource elements is 12. Similarly to the example of FIG. 14, since the number of resource element combinations is not a power of two ($2^n$), in the case of the conventional IM, the number of combinations on which bits can be actually carried, of the number of resource element combination candidates is wasted.

In the present embodiment, also in the case of the example illustrated in FIG. 16, since a complex signal constellation including non-$2^m$ complex constellation points is used, the number of bits is determined from a value of multiplication of the number of resource element combination candidates and the number of complex constellation point candidates. Appropriate values are set to the number of resource element combination candidates and the number of complex constellation point candidates, and it is possible to reduce waste.

(Generalization)

The present embodiment is generalized as follows.

Consider that the index modulation (IM) using G kinds of complex signal constellations is performed on N resource elements. Here, the g-th complex signal constellation includes $M_g$ non-zero complex signal constellations, and the complex signal constellation is applied to each of $K_g$ resource elements. In this configuration, the number $N_B$ of bits to be carried on the N resource elements can be obtained according to the following formula (11).

$$N_B = \text{floor}\left(\log_2\left[\prod_{g=1}^{G}\{M_g^{K_g}\}C\right]\right) \tag{11}$$

$$C = \prod_{g=1}^{G}\left\{\binom{N - \sum_{g'=0}^{g-1} K_{g'}}{K_g}\right\}$$

In the formula (11), K satisfies the following formula (12).

$$K_0 = 0, \sum_{g=1}^{G} K_g \leq N \tag{12}$$

<3-3. Switching Between Complex Signal Constellations>

As described above, in a case where the number C of resource element combination candidates is $C \neq 2^n$, the communication device desirably applies the complex signal constellation where the number of elements is M=. However, in a case where the number C of resource element combination candidates is $C=2^n$, it is desirable to apply the complex signal constellation where the number of elements is $M=2^m$. In the present embodiment, the complex signal constellation actually used is appropriately switched according to the number C of resource element combination candidates.

Figure 17:
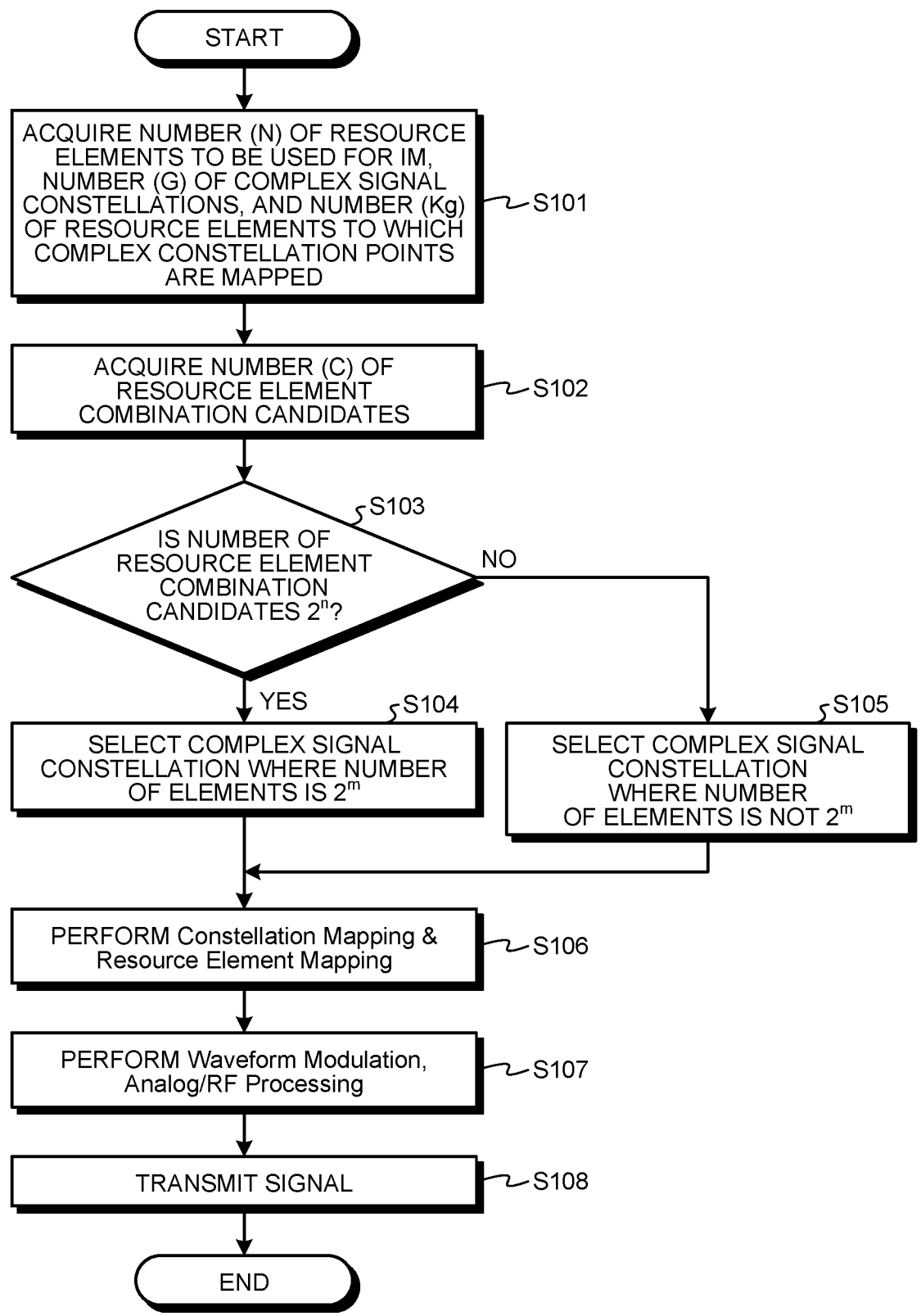
FIG. 17 is a flowchart illustrating a determination process of switching the complex signal constellations according to the number of resource element combination candidates.

FIG. 17 is a flowchart illustrating a determination process of switching the complex signal constellations according to the number of resource element combination candidates. The determination process illustrated in FIG. 17 is performed by, for example, the communication device that performs data transmission. The communication device that performs the determination process may be the base station device 20, the relay device 30, or the terminal device 40. The determination process will be described below with reference to the flowchart of FIG. 17.

Note that, in the following, an example that the terminal device 40 performs the determination process is descried. As a matter of course, the device that performs the following determination process may be the base station device 20 or the relay device 30.

First, the acquisition unit 451 of the terminal device 40 acquires the number (N) of resource elements used for IM, the number (G) of complex signal constellations used for the IM, and the number (Kg) of resource elements to which the complex constellation points of the respective complex signal constellations are mapped (Step S101). The acquisition unit 451 may acquire this information from another communication device (e.g., the base station device 20). Note that this information may be pre-configured in the storage unit 42 or the like of the terminal device 40 as predetermined values. In this configuration, the acquisition unit 451 may acquire this information from the storage unit 42.

Next, the acquisition unit 451 acquires the number (C) of resource element combination candidates (Step S102). The acquisition unit 451 may calculate the number of resource element combination candidates on the basis of the information (N, G, and Kg) acquired in Step S101. Furthermore, the acquisition unit 451 may acquire information about the number of resource element combination candidates from another communication device (e.g., the base station device 20). Note that the number of resource element combination candidates may be pre-configured in the storage unit 42 or the like of the terminal device 40, as a predetermined value. In this configuration, the acquisition unit 451 may acquire information about the number of resource element combination candidates from the storage unit 42.

Next, the conversion unit 452 of the terminal device 40 switches the complex signal constellations used for IM. Specifically, the conversion unit 452 determines whether the number of resource element combination candidates is a power of two ($2^n$) (Step S103). When the number of resource element combination candidates is a power of two (Step S103: Yes), the conversion unit 452 selects a complex signal constellation (second signal constellation) including a power of two ($M=2^m$) number of elements, as the complex signal constellation used for IM (Step S104). On the other hand, when the number of resource element combination candidates is not a power of two (Step S103: No), the conversion unit 452 selects a complex signal constellation (first signal constellation) including a non-power of two number ($M \neq 2^m$) of elements (M), as the complex signal constellation used for IM (Step S105).

After switching the complex signal constellations, the conversion unit 452 controls the transmission processing unit 412 to perform constellation mapping and resource element mapping (Step S106).

Furthermore, the conversion unit 452 controls the transmission processing unit 412 to perform waveform modulation and analog/RF processing (Step S107).

Then, the transmitting unit 245 of the terminal device 40 controls the transmission processing unit 412 to transmit a signal from the antenna 414 (Step S108).

<3-4. Setting of Various Parameters>

Note that each setting unit of each communication device (e.g., the base station device 20, the relay device 30, or the terminal device 40) may perform setting for the complex constellation point sequence. For example, the setting unit may set information about the resource element mapping, the complex signal constellation, and complex constellation point elements, for each communication unit of each communication device. At this time, the setting unit of the communication device may be the setting unit 243 of the base station device 20, the setting unit 343 of the relay device 30, or the setting unit 453 of the terminal device 40.

Note that in specifically defining the resource element mapping, the complex signal constellation, and the complex constellation point elements, it is desirable to set a Euclidean distance or a minimum Euclidean distance in the combination of the complex constellation point elements to a predetermined value or more.

In particular, in the conventional modulation method, the minimum Euclidean distance between a single complex constellation point element (complex scalar) and another single complex constellation point element is considered (regarded as important), but in the present invention, it is desirable to pay further attention to the minimum Euclidean distance between a set of complex constellation point elements (complex vector) and another set of complex constellation point elements, in a plurality of resource elements.

For example, it is assumed that D complex vectors having L elements are defined. A Euclidean distance $E_{m,n}$ between two different complex vectors $s_m$ and $s_n$ of the D complex vectors is defined by the following formula (13).

$$E_{m,n} = \sqrt{\sum_{l=1}^{L} |s_{m,l} - s_{n,l}|^2} \qquad (13)$$

Here, $s_{m,l}$ and $s_{n,l}$ are the l-th elements of the complex vectors $s_m$ and $s_n$.

For example, the setting unit performs setting for the complex constellation point sequence so that the Euclidean distance is equal to or larger than a predetermined value $E_{th}$, as shown in the following formula (14), in a set of all complex vectors defined by the resource element mapping, complex signal constellation, and complex constellation point elements.

$$E_{m,n} \geq E_{th}, \text{ where } 1 \leq m,n \leq L, m \neq n \qquad (14)$$

Alternatively, the setting unit performs setting for the complex constellation point sequence so that the minimum Euclidean distance $E_{min}$ in a set of all complex vectors defined by the resource element mapping, the complex signal constellation, and the complex constellation point elements is equal to or larger than the predetermined value $E_{th}$, for example, as shown in the following formula (15).

$$E_{min} \geq E_{th} \qquad (15)$$

$$\text{where } E_{min} = \min_{1 \leq m,n \leq L, m \neq n} E_{m,n}$$

Here, the setting unit may use, as the predetermined value $E_{th}$, a minimum Euclidean distance $E_{min, g}$ of the complex constellation point elements (complex scalar) in a certain constellation g of the complex signal constellation used to define a target complex vector. Alternatively, the setting unit may use, as the predetermined value $E_{th}$, a value $\delta E_{min, g}$ obtained by multiplying the minimum Euclidean distance $E_{min, g}$ by a coefficient $\delta$ ($\geq 0$).

<3-5. Expansion of Signal Constellation Including Non-Power of Two Number of Complex Constellation Points>

In the present invention, in a case where a plurality of (e.g., G types of) complex signal constellations are prepared as described above, the complex signal constellation is expanded.

In a case where the indexes of two different constellations are $g_1$ and $g_2$, it is desirable that any complex constellation point $s_{g1, a}$ included in the constellation $g_1$ and any complex constellation point $s_{g2, b}$ included in the constellation $g_2$ may not overlap each other, for example, as shown in the following formula (16).

$$s_{g1,a} \neq s_{g2,b}, \text{if } g_1 \neq g_2, \forall a, \forall b \qquad (16)$$

In addition, only when zero (0+0j) complex constellation point is included in the constellations, the zero complex constellation points may overlap between different constellations.

It is desirable that the elements of the complex constellation point in the constellation can be expressed by a predetermined operation for the complex constellation point elements in another constellation. In particular, it is desirable that elements of all complex constellation points in a certain constellation $g_1$ can be expressed by a common operation for the complex constellation point elements in another certain constellation $g_2$. At this time, the predetermined operation is desirably a linear operation. In addition, the constellations $g_1$ and $g_2$ desirably have the same number of bits per complex constellation point (i.e., desirably $M_1=M_2$ and $m_1=m_2$).

FIG. 18 is a diagram illustrating an example of expansion of the complex signal constellation by phase rotation. In the example illustrated in FIG. 18, $G=2$. When a complex signal constellation is defined by giving a phase difference to each complex constellation point of another complex signal constellation, the complex constellation point elements $s_{g1, a}$ of the certain constellation $g_1$ can be defined as shown in the following formula (17) by using the complex constellation point elements $s_{g2, b}$ of the another constellation $g_2$.

$$s_{g1,a} = \exp(j\theta_{g1,g2}) s_{g2,b} \qquad (17)$$

In the above formula, the value of 0 (real number) can be common to all elements between two certain constellations. The values are different between different constellations. In addition, the value is desirable that $g\pi/(G-1)$ (where $g=1, \ldots, G$) for the number G of constellations.

Figure 19:
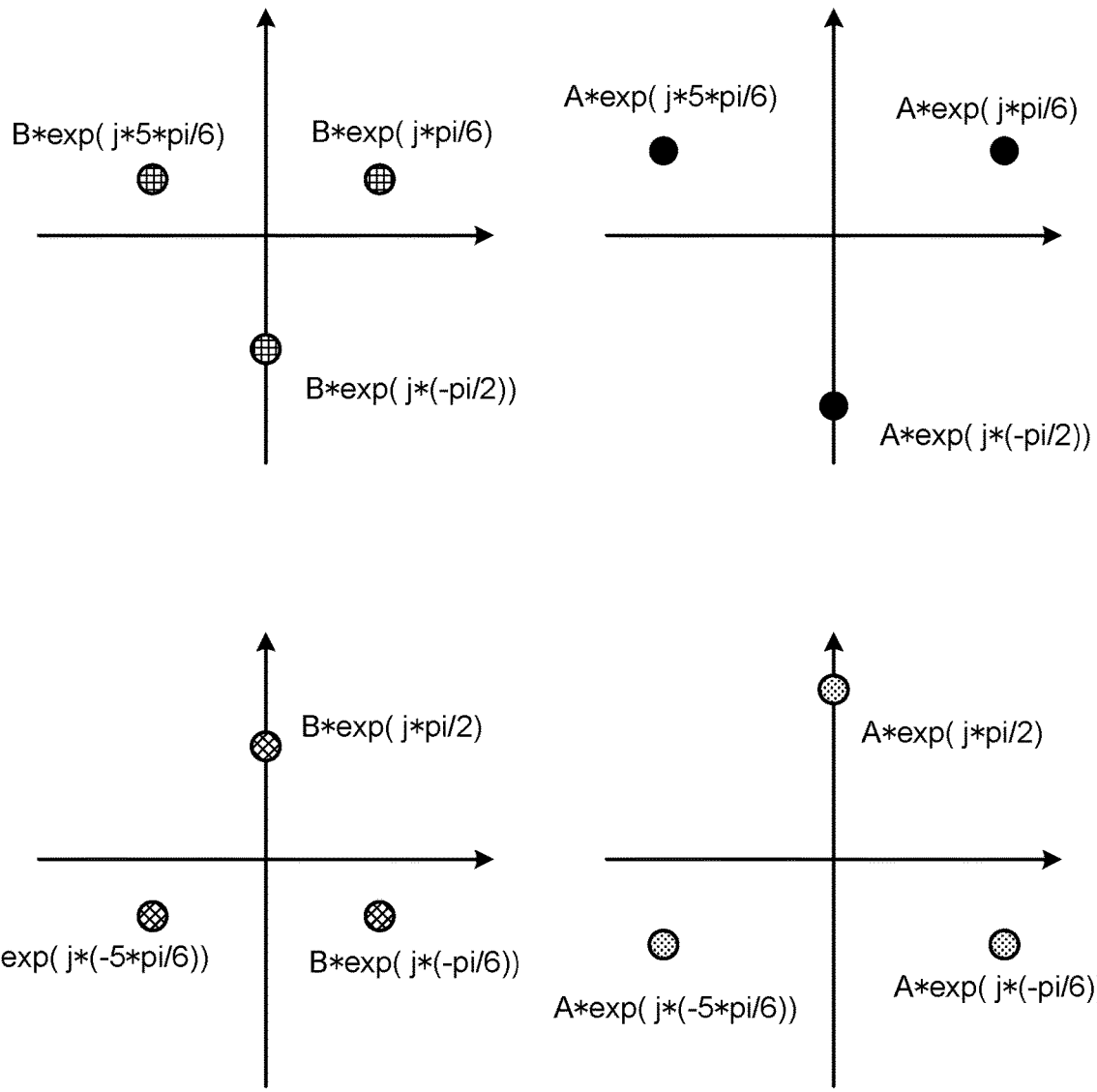
FIG. 19 is a diagram illustrating an example of expansion of the complex signal constellation by phase rotation and amplitude change.

FIG. 19 is a diagram illustrating an example of expansion of the complex signal constellation by phase rotation and amplitude change. In the example illustrated in FIG. 19, $G_p=2$ and $G_a=2$. When a plurality of constellations is defined by giving at least one of a phase difference or an amplitude difference to each complex constellation point of a complex signal constellation, the complex constellation point elements $s_{g1,a}$ of the certain constellation $g_1$ can be defined as shown in the following formula (18) by using the complex constellation point elements $s_{g2,b}$ of the another constellation $g_2$.

$$s_{g1,a} = |Z_{g1,g2}|\exp(j\theta_{g1,g2})s_{g2,b} \quad (18)$$

In the above formula, the values of Z (complex number, or real or pure imaginary number) and θ (real number) can be common to all elements between two constellations. The values are different between different constellations. In addition, for the phase difference and the amplitude difference, when $G_p$ features are provided in the phase difference and $G_a$ features are provided in the amplitude difference to form G constellations, it is desirable that $G=G_p G_a$ and that $g\pi/(G_p-1)$ (where $g=1, \ldots, G_p$) as an example of the value of the phase difference.

When a plurality of constellations is defined by giving a linear shift to each complex constellation point of a complex signal constellation, the complex constellation point elements $s_{g1,a}$ of the certain constellation $g_1$ can be defined as shown in the following formula (19) by using the complex constellation point elements $s_{g2,b}$ of the another constellation $g_2$.

$$s_{g1,a} = s_{g2,b} + C_{g1,g2} \quad (19)$$

In the above equation, the value of C (complex number, real number, or pure imaginary number) can be common to all elements between two constellations. The values are different between different constellations.

In general, it is desirable that complex constellation point elements of a certain constellation can be defined by giving operations for the amplitude, the phase, and a constant to complex constellation point elements of another constellation, for example, as shown in the following formula (20).

$$s_{g1,a} = |Z_{g1,g2}|\exp(j\theta_{g1,g2})s_{g2,b} + C_{g1,g2} \quad (20)$$

In addition, it is desirable that the values of the amplitude, the phase, the constant may have a relationship shown by the following formula (21) for two certain constellations $g_1$ and $g_2$.

$$\theta_{g1,g2} = -\theta_{g1,g2}$$

$$|Z_{g1,g2}| = |Z_{g1,g2}|^{-1}$$

$$C_{g1,g2} = -C_{g1,g2} \quad (21)$$

<3-6. Resource Element Mapping>

Next, an example of radio resources to which the present embodiment is applied will be described.

(Application to One-Dimensional Resource)

First, an example of application of index modulation (IM) proposed in the present embodiment to a one-dimensional resource of the radio resources will be described.

Figure 20:
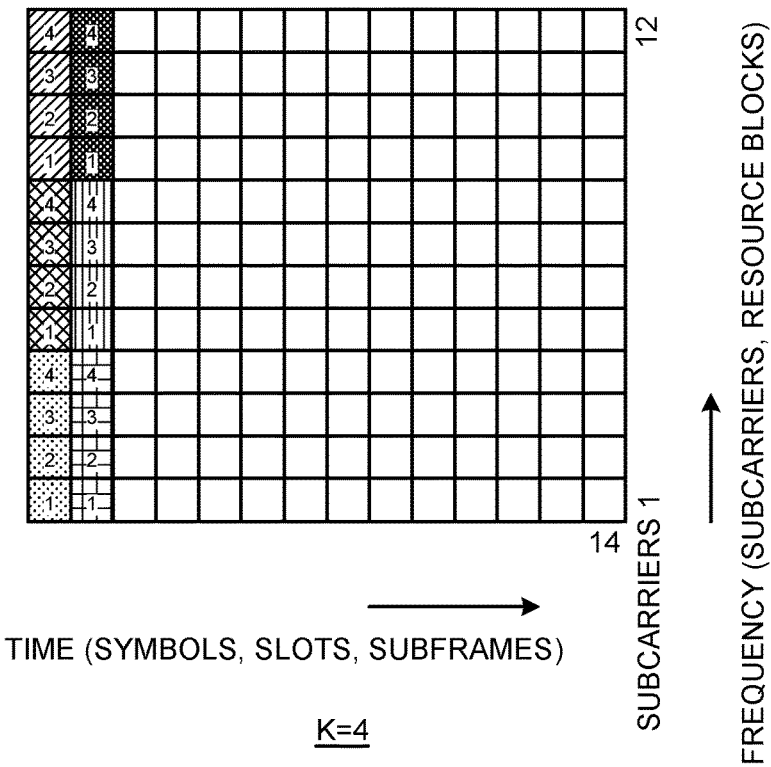
FIG. 20 is a diagram illustrating an example of application of IM proposed in the present embodiment to a frequency domain.
Figure 21:
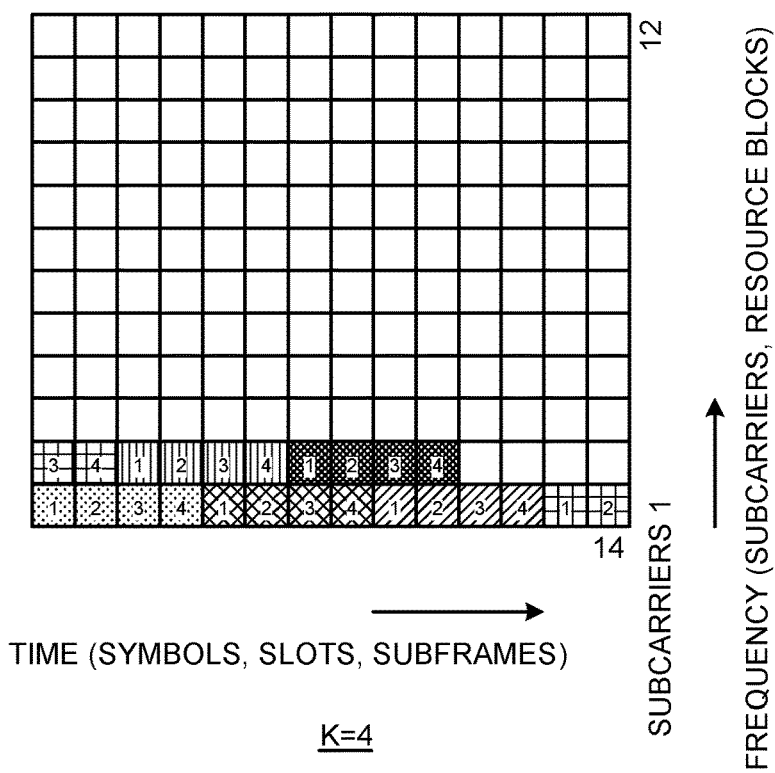
FIG. 21 is a diagram illustrating an example of application of IM proposed in the present embodiment to a time domain.
Figure 22:
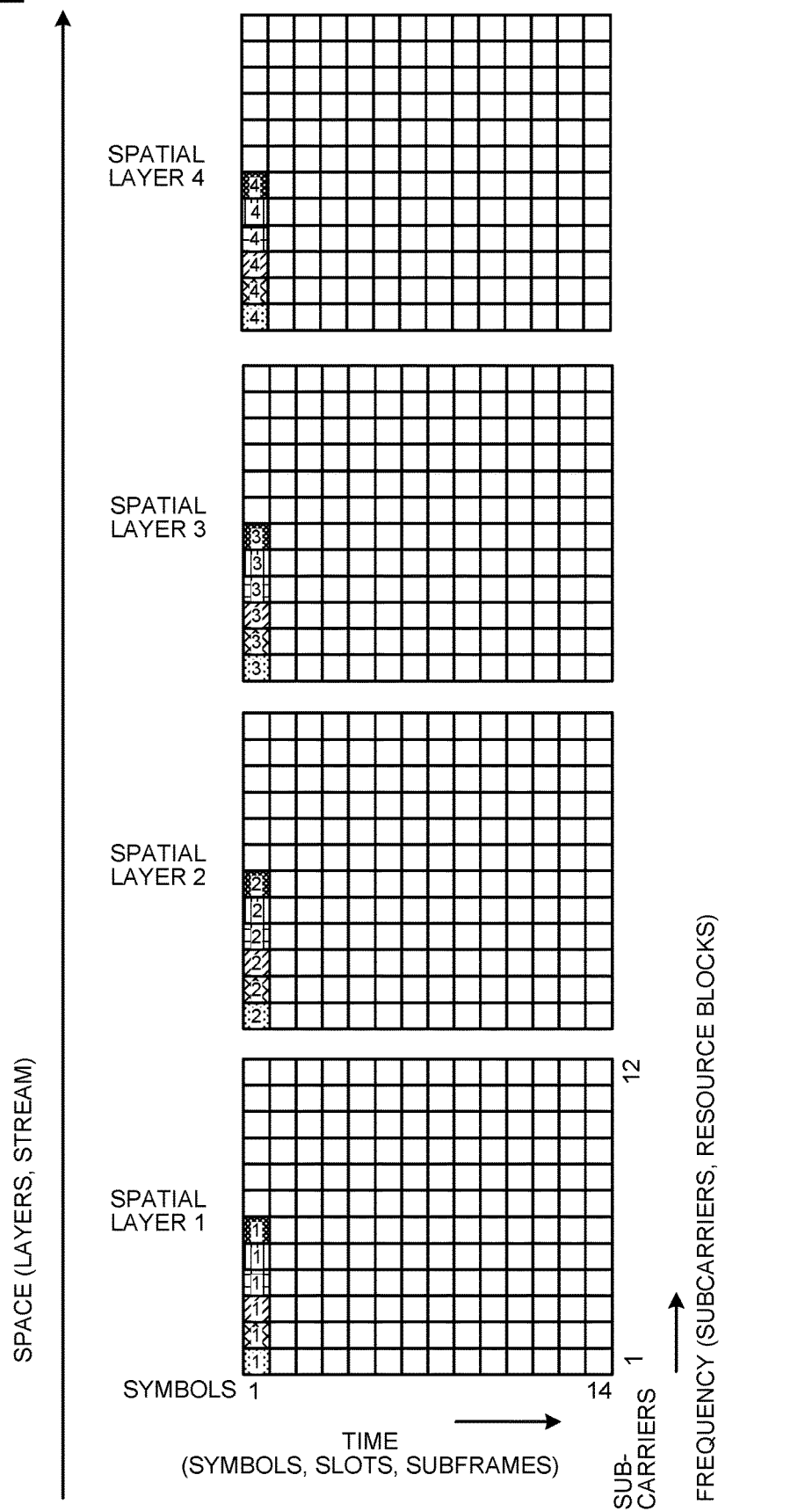
FIG. 22 is a diagram illustrating an example of application of IM proposed in the present embodiment to a space domain.

FIG. 20 is a diagram illustrating an example of application of IM proposed in the present embodiment to a frequency domain. FIG. 21 is a diagram illustrating an example of application of IM proposed in the present embodiment to a time domain. FIG. 22 is a diagram illustrating an example of application of IM proposed in the present embodiment to a space domain. In the examples of FIGS. 20 to 22, the number K of resource elements to which the complex constellation points are mapped is 4. In each drawing, different hatching indicates the units of clusters of four resources to which IM proposed in the present embodiment is applied.

In each domain, continuous resources are used as one unit (one cluster) of IM, but it is not always necessary to use continuous resources as the unit. For example, one unit of IM may be constituted by intermittent radio resources (interleaved radio resources). Constituting one unit of IM with continuous resources makes it possible to simplify processing for reception, demodulation, and decoding. Furthermore, in particular, the cluster in the time domain makes it possible to reduce a waiting time to receive, demodulate, or decode the cluster. In addition, in a case where one unit of IM is constituted by the intermittent radio resources, an effect of reception diversity (frequency diversity, time diversity, and/or spatial diversity) in each domain can be expected.

(Application to Multidimensional Resources)

Figure 23:
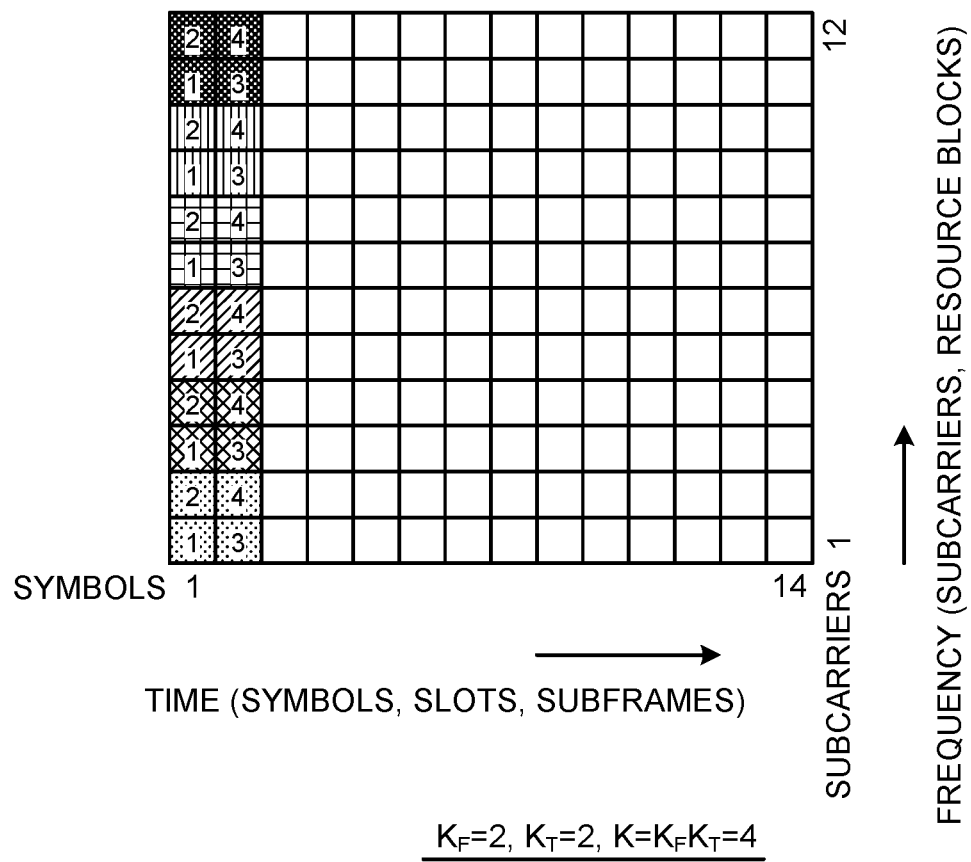
FIG. 23 is a diagram illustrating an example of application of IM proposed in the present embodiment, to a two-dimensional radio resource in the frequency domain and the time domain.
Figure 24:
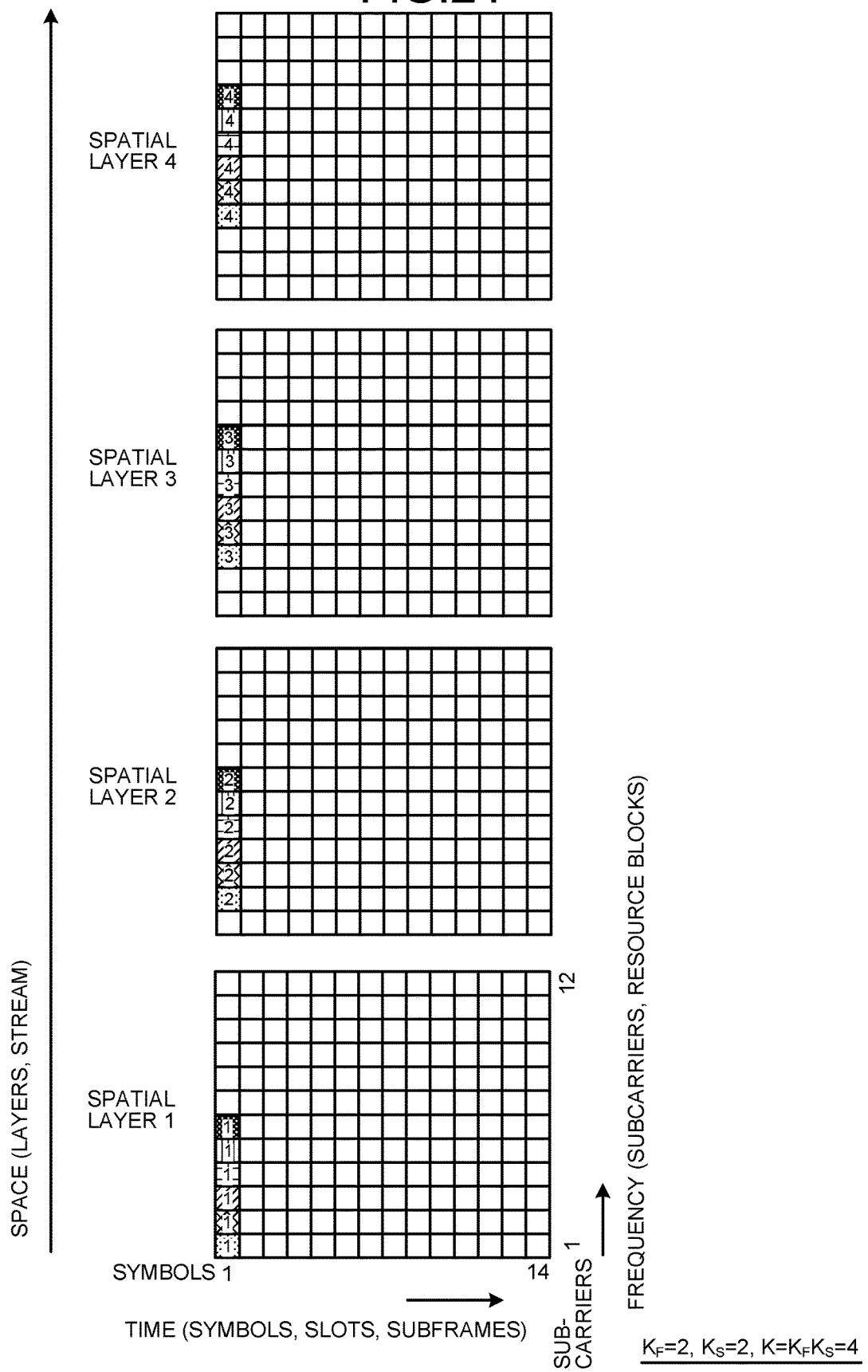
FIG. 24 is a diagram illustrating an example of application of IM proposed in the present embodiment to a two-dimensional radio resource in the frequency domain and the space domain.

A cluster of K resources to which IM of the present embodiment is applied may spread over a plurality of (multidimensional) radio resource regions. FIG. 23 is a diagram illustrating an example of application of IM proposed in the present embodiment, to a two-dimensional radio resource in the frequency domain and the time domain. Furthermore, FIG. 24 is a diagram illustrating an example of application of IM proposed in the present embodiment, to the two-dimensional radio resource in the frequency domain and the space domain.

In the example of FIG. 23, the number KF of resource elements in the frequency domain to which the complex constellation points are mapped is 2, the number $K_T$ of resource elements in the time domain to which the complex constellation points are mapped is 2, and the number K of resource elements to which the complex constellation points are mapped is 4. In the example of FIG. 24, the number $K_F$ of resource elements in the frequency domain to which the complex constellation points are mapped is 2, the number $K_S$ of resource elements in the space domain to which the complex constellation points are mapped is 2, and the number K of resource elements to which the complex constellation points are mapped is 4.

In a case where IM proposed in the present embodiment is applied to the multidimensional radio resource, a higher reception diversity effect can be expected, as compared in the one-dimensional radio resource described above.

<3-7. Reception Process>

Figure 25:
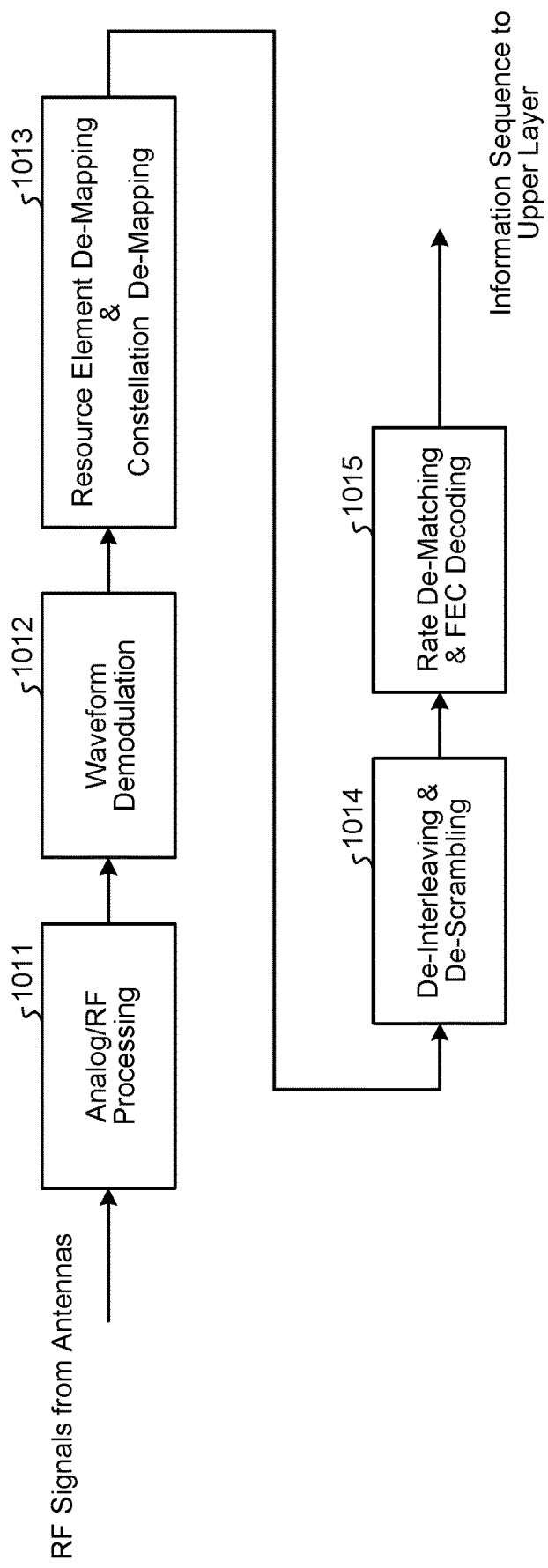
FIG. 25 is a block diagram schematically illustrating an example of signal processing related to data reception according to an embodiment of the present disclosure.

Next, an example of a block diagram on the reception side in the communication device (e.g., the base station device 20, the relay device 30, or the terminal device 40) of the present embodiment will be described. FIG. 25 is a block diagram schematically illustrating an example of signal processing related to data reception according to an embodiment of the present disclosure. The block diagram illustrated in FIG. 25 is applicable to, for example, the reception processing unit 211 (e.g., the demodulation unit 211c) of the base station device 20, the reception processing unit 311 of the relay device 30, or the reception processing unit 411 of the terminal device 40.

As illustrated in FIG. 25, the communication device that performs signal processing (transmission process) of the present embodiment includes an analog/RF processing block 1011, a waveform demodulation block 1012, a resource element de-mapping and constellation de-mapping block 1013, a de-interleaving and de-scrambling block 1014, and a rate de-matching and FEC decoding block 1015.

The analog/RF processing block 1011 performs analog processing, frequency conversion processing, analog-digital conversion processing, and the like on a signal received by the antenna. Therefore, the signal received by the antenna is converted to a digital signal.

Then, the waveform demodulation block 1012 performs demodulation processing according to a waveform being used. For example, the waveform demodulation block 1012 performs discrete Fourier transform (DFT), inverse discrete Fourier transform (IDFT), fast Fourier transform (FFT), inverse fast Fourier transform (IFFT), or the like, for demodulation of orthogonal frequency division multiple access (OFDMA) or single carrier frequency division multiple access (SC-FDMA).

Thereafter, the resource element de-mapping and constellation de-mapping block 1013 performs resource element de-mapping. For example, the resource element de-mapping and constellation de-mapping block 1013 performs processing of extracting a resource element of a signal desired to be demodulated and decoded, according to a physical channel configuration, a reference signal configuration, allocation of resource elements for each user, or the like.

Then, the resource element de-mapping and constellation de-mapping block 1013 performs constellation de-mapping. For example, the resource element de-mapping and constellation de-mapping block 1013 performs reception, demodulation, and decoding corresponding to a transmission method according to the present embodiment. Here, the resource element de-mapping and constellation de-mapping block 1013 outputs a hard decision value or a soft decision value of a target encoded bit sequence (or transmission bit sequence). The hard decision value is a sequence of binary discrete values of $\{0,1\}$ (or $\{-1,1\}$). The soft decision value is also referred to as soft decision, soft information, or log likelihood ratio information (LLR information), and is a sequence of continuous values or a sequence of discrete values at a plurality of levels. As a constellation de-mapping algorithm, linear filtering such as zero forcing (ZF) or minumum mean square error (MMSE), or a non-linear algorithm such as maximum likelihood detection (ML detection) or maximum likelihood estimation (ML estimation) can be used.

After the soft decision value and the LLR are generated, the de-interleaving and de-scrambling block 1014 performs de-interleaving and de-scrambling corresponding to the processing of interleaving and scrambling performed on the transmission side.

Furthermore, the rate de-matching and FEC decoding block 1015 performs rate de-matching and FEC decoding corresponding to the processing on the transmission side, and decodes an information bit sequence in an upper layer.

The communication device on the reception side may regenerate a transmission signal replica (e.g., soft replica, soft interference replica, etc.) from the temporarily decoded information bit sequence in the upper layer, feed back the transmission signal replica to constellation de-mapping or soft decision value generation processing, and perform iterative decoding (iterative/turbo de-mapping, iterative/turbo equalization, iterative/turbo decoding, iterative/turbo cancellation, etc.). Such repetitive processing makes it possible to improve reception performance.

<3-8. Setting Process>

In order to perform the transmission process or the reception process of the present embodiment, it is necessary to share (set as common knowledge) information about the constellation mapping/de-mapping between the communication device on the transmission side and the communication device on the reception side, by using some method. The information is preferably shared between the communication devices via the system information, RRC signaling, control information, or the like. Hereinafter, a setting process for information sharing will be described.

(Uplink or Downlink)

Figure 26:
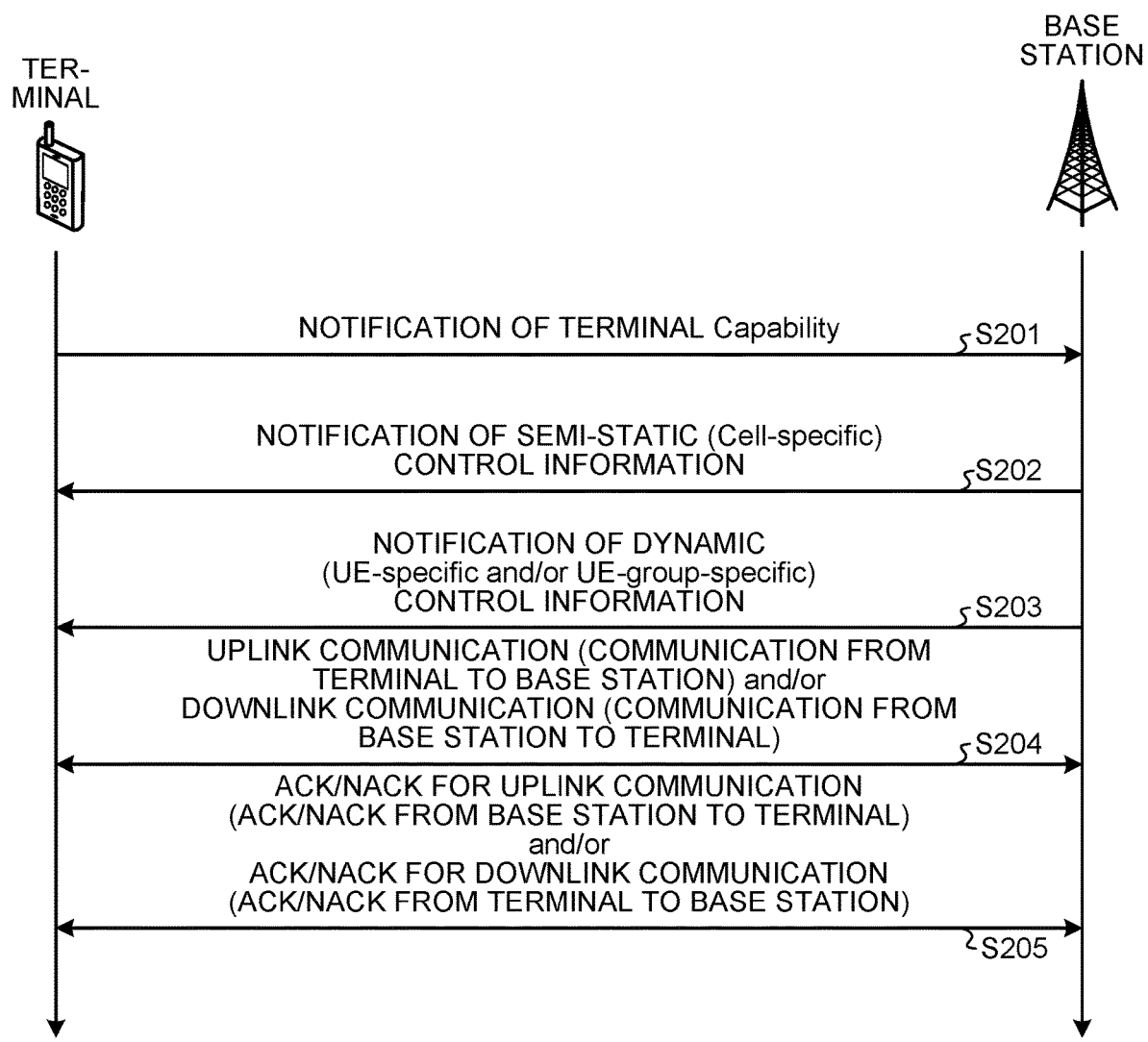
FIG. 26 is a sequence diagram illustrating a setting process in uplink or downlink communication.

First, the setting process for information sharing in uplink or downlink communication will be described. FIG. 26 is a sequence diagram illustrating the setting process in uplink or downlink communication.

First, the terminal device 40 notifies the base station device 20 to which the terminal device 40 itself is connected, of capability information (Step S201). For example, the terminal device 40 notifies the base station device 20 whether the terminal device 40 itself supports the index modulation (IM) proposed in the present embodiment. For example, the terminal device 40 notifies whether each of a plurality of complex constellation points constituting the complex constellation point sequence can be converted to any complex constellation point or zero complex constellation point of the first signal constellation including non-power of two number of complex constellation points.

When the terminal device 40 does not support IM proposed in the present embodiment, the terminal device 40 communicates with the base station device 20 by using a normal communication method (e.g., an OFDMA system, a DFT-spread-OFDMA system, or the like). When the terminal device 40 supports IM proposed in the present embodiment, specific values of parameters necessary for implementation of IM proposed in the present embodiment are shared between the communication devices (Step S202 and/or Step S203). For example, the terminal device 40 and the base station device 20 share values such as the number N of resource elements used for IM, the number G of complex signal constellations, the number Kg of resource elements to which complex constellation points are mapped, the number C of resource element combination candidates, and the number M of complex constellation points of the signal constellation used.

When communication is performed on a physical control channel (physical downlink control channel (PDCCH), physical uplink control channel (PUCCH), etc.), it is desirable for the base station device 20 to notify the terminal device 40 of the parameters used for IM of the present embodiment, as semi-static information or cell-specific information. For example, the base station device 20 may notify the terminal device 40 of the parameters used for the IM of the present embodiment, as the system information and the RRC signaling by using a physical broadcast channel (PBCH) or a physical downlink shared channel (PDSCH).

When communication is performed on a physical shared channel (PDSCH, physical uplink shared channel (PUSCH), etc.), it is desirable for the base station device 20 to notify the terminal device 40 of the parameters used for IM of the present embodiment, as dynamic information or terminal-specific (UE-specific, UE-group-specific) information. For example, it is desirable for the base station device 20 to notify the terminal device 40 of the parameters used for IM of the present embodiment, as the downlink control information (DCI), by using the physical control channel (PDCCH). At this time, the radio resources (frequency (resource block, component carrier), time (subframe, slot, mini-slot), space (the number of MIMO layers (spatial layers, spatial streams)), etc.) to be used by the terminal device 40 may be notified of, together with the parameters used for IM of the present embodiment.

The terminal device 40 that has received the parameter from the base station device 20 performs communication by using the communication method (IM proposed in the present embodiment) of the present embodiment (Step S204). For example, in the uplink, the terminal device 40 uses the values of the parameters and the radio resource that are notified from the base station device 20 to transmit a signal to the base station device 20 by using the communication method of the present embodiment. Furthermore, in the downlink, the terminal device 40 performs the reception process, assuming that the base station device 20 transmits a signal to the terminal device 40 by using the parameters and the radio resource that are notified from the base station device 20.

The base station device 20 or the terminal device 40 transmits ACK or NACK in response to the transmission in Step S204 (Step S205).

(Sidelink)

Figure 27:
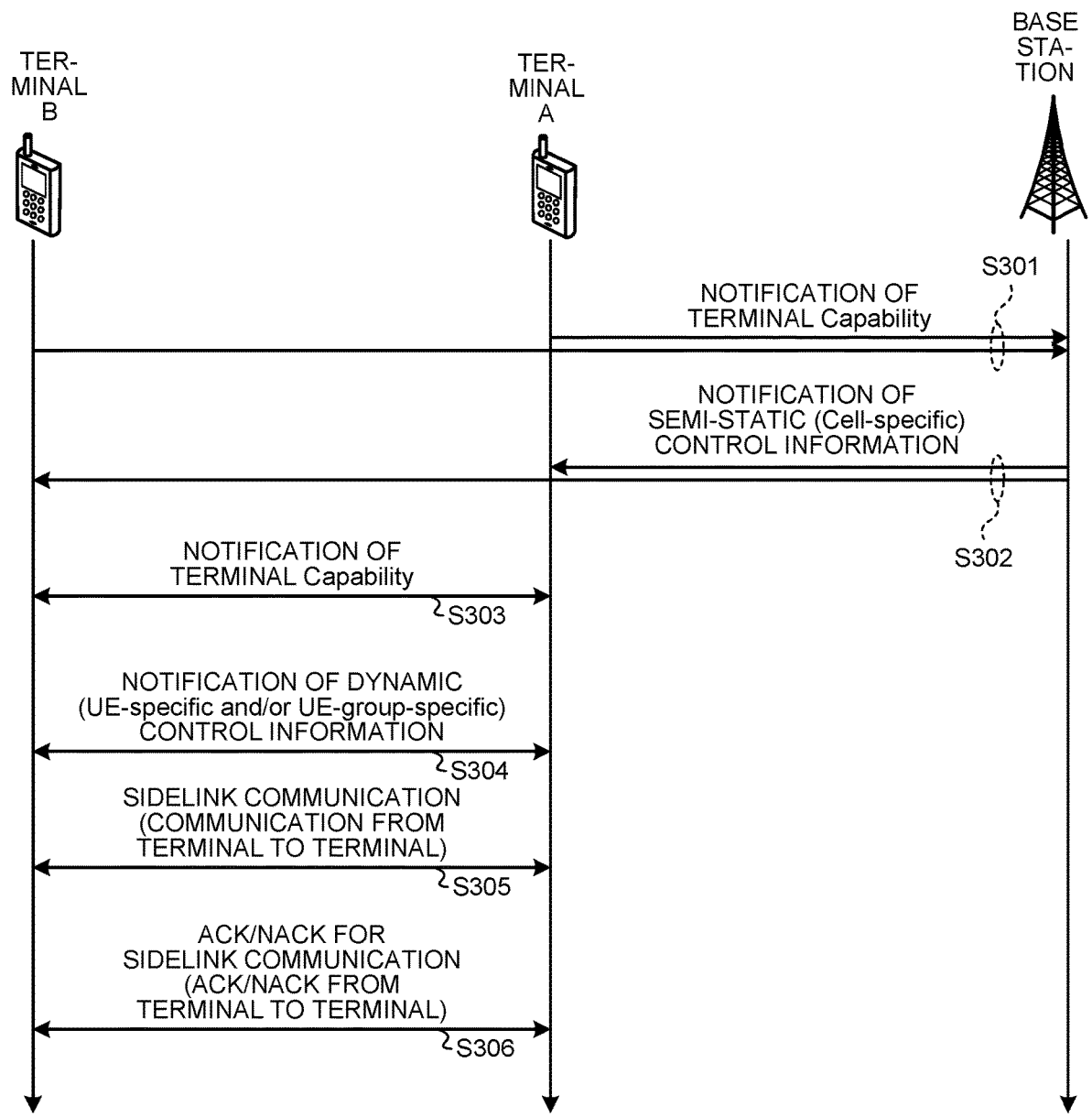
FIG. 27 is a sequence diagram illustrating a setting process in sidelink communication.

Next, a setting process in sidelink will be described. In the sidelink as well, it is desirable for the terminal device 40 to notify the base station device 20 to which the terminal device 40 itself is connected, of whether IM proposed in the present embodiment can be supported. FIG. 27 is a sequence diagram illustrating the setting process in sidelink communication. Note that in the following description, one terminal device 40 in the sidelink communication is referred to as a terminal A, and the other terminal device 40 is referred to as a terminal B.

The terminals A and B notify the base station device 20 to which the terminals A and B are connected, of the capability information (Step S301). For example, the terminals A and B notify the base station device 20 to which the terminals A and B are connected, of whether IM proposed in the present embodiment can be supported.

The base station device 20 notifies the terminals A and B of information about the radio resources (e.g., information about a radio resource pool specified in time and frequency) that may be used for sidelink communication. The notification of the information about the radio resources is desirably notified as semi-static information. At this time, the base station device 20 may also notify the terminals A and B of the values of the parameters to be applied for use of IM proposed in the present embodiment, as the semi-static information (Step S302). The values of the parameters to be notified of may be, for example, the number N of resource elements used for IM, the number G of complex signal constellations, the number Kg of resource elements to which complex constellation points are mapped, the number C of resource element combination candidates, and the number M of complex constellation points of the signal constellation used.

The terminals A and B use the radio resources (radio resource pool) specified by the base station device 20 to notify each other of the capability information of the terminals A and B (Step S303). For example, each of the terminals A and B may notify the terminal device 40 of the other party, of whether IM proposed in the present embodiment can be supported.

When one or both of the terminals A and B do not support IM of the present embodiment, the terminals A and B perform sidelink communication by a normal communication method. When both the terminals A and B support the communication method of the present embodiment, the terminals A and B may use semi-static values of the parameters notified from the base station device 20 to perform communication using the IM of the present embodiment (Step S305). For example, in communication using a sidelink control channel (physical sidelink control channel (PSCCH), etc.), the terminals A and B may use the parameters notified from the base station device 20 to perform communication using the IM of the present embodiment.

In communication using a sidelink shared channel (physical sidelink shared channel (PSSCH), etc.), the terminals A and B may use PSCCH to notify each other of the parameters used for IM of the present embodiment, as sidelink control information (SCI) (Step S304). Then, the terminals A and B may use the parameters the terminals A and B notified of to perform communication using the communication method of the present embodiment (Step S305).

The terminal A or the terminal B transmits ACK or NACK in response to transmission in Step S305 (Step S306).

In this way, the terminal device 40 can use the value of the parameters notified of as described above to also transmit or receive a signal for sidelink.

4. MODIFICATIONS

The embodiments described above are merely examples, and various modifications and applications are possible.

For example, in the embodiments described above, communication using the index modulation (IM) proposed in the present embodiment is performed between the base station device 20 and the terminal device 40 or between the terminal devices 40 and 40. However, the communication using IM proposed in the present embodiment is applicable to but not limited to communication between these devices, and is also applicable to, for example, communication between the base station devices 20 and 20, communication between the relay devices 30 and 30, communication between the base station device 20 and the relay device 30, and communication between the relay device 30 and the terminal device 40.

Furthermore, in the embodiments described above, the communication device acquires the parameters used for IM proposed in the present embodiment, from another communication device. However, the communication device may hold the values of the parameters as fixed values in advance. For example, in a case where IM of the present embodiment is used in a physical broadcast channel (PBCH) used for notification of the first system information, it is difficult to notify preceding parameter, and thus, the communication device (e.g., the base station device 20) may transmit or receive a signal using a predetermined parameter value.

The processing device (control device) that controls the management device 10, the base station device 20, the relay device 30, or the terminal device 40 according to the present embodiment may be implemented by a dedicated computer system or a general-purpose computer system.

For example, communication programs for executing the above-described operations are stored in a computer-readable recording medium such as an optical disk, a semiconductor memory, a magnetic tape, or a flexible disk, for distribution. Then, for example, the program is installed on a computer, the process described above is performed, and the control device is configured. At this time, the control device may be a device (e.g., a personal computer) outside the management device 10, base station device 20, relay device 30, or terminal device 40. Furthermore, the control device may be a device (e.g., the control unit 13, the control unit 24, the control unit 34, or the control unit 45) inside the management device 10, base station device 20, relay device 30, or terminal device 40.

Furthermore, the communication program may be stored in a disk device included in a server device on a network such as the Internet so as to be, for example, downloaded to the computer. Furthermore, the functions described above may be implemented by cooperation between an operating system (OS) and application software. In this configuration, the portion other than the OS may be stored in a medium so as to be distributed, or the portion other than the OS may be stored in the server device so as to be downloaded or the like to the computer.

Furthermore, of the processes described in the above embodiments, all or some of processes described to be performed automatically may be performed manually, or all or some of processes described to be performed manually may be performed automatically by a known method. In addition, the processing procedures, specific names, and information including various data and parameters, which are illustrated in the above description or the drawings can be appropriately changed unless otherwise specified. For example, various types of information illustrated in the drawings are not limited to the illustrated information.

Furthermore, the components of the devices are illustrated as functional concepts and are not necessarily required to be physically configured as illustrated. In other words, specific forms of distribution or integration of the devices are not limited to those illustrated, and all or some of the specific forms may be configured by being functionally or physically distributed or integrated in appropriate units, according to various loads or usage conditions.

Furthermore, the embodiments described above can be appropriately combined within a range consistent with the contents of the processing. Furthermore, the order of the steps illustrated in each of the flowchart and sequence diagrams of the embodiments described above can be changed appropriately.

Furthermore, for example, the present embodiment can be implemented as all configurations constituting a device or a system, such as a processor as a system large scale integration (LSI) or the like, a module using a plurality of the processors or the like, a unit using a plurality of the modules or the like, and a set (i.e., a configuration of part of the device) obtained by further adding other functions to the unit.

Note that, in the present embodiment, the system means an aggregation of a plurality of components (devices, modules (parts), etc.), and it does not matter whether all the components are in the same housing. Therefore, a plurality of devices housed in separate housings and connected via a network, and one device in which a plurality of modules is housed in one housing are both systems.

Furthermore, for example, the present embodiment can adopt a configuration of cloud computing in which one function is shared and processed by a plurality of devices in cooperation, via a network.

5. CONCLUSION

As described above, according to an embodiment of the present disclosure, the communication device (e.g., the base station device 20, the relay device 30, or the terminal device 40) introduces the signal constellation including the non-power of two number of complex constellation points into the index modulation (IM). Specifically, the communication device converts the bit sequence to a predetermined complex constellation point sequence having a plurality of complex constellation points including the non-zero complex constellation point and the zero complex constellation point. At this time, at least one of the predetermined complex constellation point sequences is a first complex constellation point sequence in which each of a plurality of complex constellation points constituting the complex constellation point sequence is converted to any complex constellation point or zero complex constellation point of the first signal constellation including non-power of two number of complex constellation points. The communication device converts one of the bit sequences to at least the first complex constellation point sequence.

The introduction of the signal constellation including the non-power of two number of complex constellation points to IM makes it possible to increase the distance between constellation points or the distance between codes in IM than that in the conventional IM. Therefore, the communication device can improve the error rate characteristic.

Furthermore, it is possible to avoid or reduce wasted radio resources turned off, which has been a problem in conventional IM, and the communication device can achieve high frequency utilization efficiency, even in communication using high-level modulation (QAM or the like).

Although the embodiments of the present disclosure have been described above, the technical scope of the present disclosure is not limited to the embodiments described above and various modifications can be made without departing from the spirit and scope of the present disclosure. Moreover, the components of different embodiments and modifications may be suitably combined with each other.

Furthermore, the effects of the embodiments in the present description are merely examples and are not provided to limit the present disclosure, and other effects may be provided.

Note that the present technology can also employ the following configurations.

(1)

A communication device comprising:

an acquisition unit that acquires a bit sequence; and a conversion unit that converts the bit sequence to a predetermined complex constellation point sequence including a plurality of complex constellation points including a non-zero complex constellation point and a zero complex constellation point, wherein at least one of the predetermined complex constellation point sequences is a first complex constellation point sequence in which each of a plurality of complex constellation points constituting the complex constellation point sequence is converted to any complex constellation point or zero complex constellation point of a first signal constellation including non-power of two number of complex constellation points, and the conversion unit converts one of the bit sequences to at least the first complex constellation point sequence.

(2)

The communication device according to (1), wherein each of the non-power of two number of complex constellation points constituting the first signal constellation is a non-zero complex constellation point.

(3)

The communication device according to (2), wherein the plurality of complex constellation points constituting the predetermined complex constellation point sequence is mapped to a plurality of resource elements, and the conversion unit converts the bit sequence to the first complex constellation point sequence, when a number of combination candidates for mapping of the plurality of complex constellation points to the plurality of resource elements is not a power of two.

(4)

The communication device according to (3), wherein one of the predetermined complex constellation point sequences is a second complex constellation point sequence in which each of the plurality of complex constellation points constituting the complex constellation point sequence is converted to any complex constellation point or zero complex constellation point of a second signal constellation including power of two number of complex constellation points, and the conversion unit converts the bit sequence to the second complex constellation point sequence, when the number of combination candidates for mapping of the plurality of complex constellation points to the plurality of resource elements is a power of two.

(5)

The communication device according to any one of (1) to (3), further comprising a setting unit that performs setting for the predetermined complex constellation point sequence.

(6)

The communication device according to (5), wherein the setting unit sets a number of complex constellation points constituting the first signal constellation to maximize Euclidean distance between any two sequences of candidates of the predetermined complex constellation point sequence.

(7)

The communication device according to (5) or (6), wherein the plurality of complex constellation points constituting the predetermined complex constellation point sequence is mapped to a plurality of resource elements, and the setting unit sets information for determining a number of candidates of the first complex constellation point sequence to reduce a difference between the number of candidates of the first complex constellation point sequence and a power of two relative to a difference between a number of combination candidates for mapping of the plurality of complex constellation points to the plurality of resource elements and another power of two.

(8)

The communication device according to any one of (5) to (7), wherein the setting unit sets an amplitude of the complex constellation point so that the non-power of two number of complex constellation points have an average power of a predetermined value.

(9)

The communication device according to any one of (1) to (8), wherein the non-power of two number of complex constellation points constituting the first signal constellation are complex constellation points having amplitudes equal to each other.

(10)

The communication device according to any one of (1) to (9), wherein phase intervals between the non-power of two number of complex constellation points constituting the first signal constellation are equal.

(11)

The communication device according to any one of (1) to (10), further comprising an acquisition unit that acquires setting information about the predetermined complex constellation point sequence, wherein the acquisition unit acquires the setting information about the predetermined complex constellation point sequence from a communication device as a communication partner.

(12)

The communication device according to any one of (1) to (11), further comprising an acquisition unit that acquires setting information about the predetermined complex constellation point sequence, wherein the acquisition unit acquires the setting information about the predetermined complex constellation point sequence from a communication device other than that of a communication partner.

(13)

The communication device according to (12), wherein the communication device other than that of the communication partner is a base station device.

(14)

A communication method, comprising:

acquiring a bit sequence; and converting the bit sequence to a predetermined complex constellation point sequence including a plurality of complex constellation points including a non-zero complex constellation point and a zero complex constellation point, wherein at least one of the predetermined complex constellation point sequences is a first complex constellation point sequence in which each of a plurality of complex constellation points constituting the complex constellation point sequence is converted to any complex constellation point or zero complex constellation point of a first signal constellation including non-power of two number of complex constellation points, and the converting the bit sequence to the predetermined complex constellation point sequence includes converting one of the bit sequences to at least the first complex constellation point sequence.

(15)

A communication program causing a computer to function as an acquisition unit that acquires a bit sequence; and a conversion unit that converts the bit sequence to a predetermined complex constellation point sequence including a plurality of complex constellation points including a non-zero complex constellation point and a zero complex constellation point, wherein at least one of the predetermined complex constellation point sequences is a first complex constellation point sequence in which each of a plurality of complex constellation points constituting the complex constellation point sequence is converted to any complex constellation point or zero complex constellation point of a first signal constellation including non-power of two number of complex constellation points, and the conversion unit converts one of the bit sequences to at least the first complex constellation point sequence.

REFERENCE SIGNS LIST

1 COMMUNICATION SYSTEM
10 MANAGEMENT DEVICE
20 BASE STATION DEVICE
30 RELAY DEVICE
40 TERMINAL DEVICE
11 COMMUNICATION UNIT
21, 31, 41 COMMUNICATION UNIT
12, 22, 32, 42 STORAGE UNIT
13, 24, 34, 45 CONTROL UNIT 23, 33, 43 NETWORK COMMUNICATION UNIT
44 INPUT/OUTPUT UNIT
211, 311, 411 RECEPTION PROCESSING UNIT
211a RADIO RECEPTION UNIT
211b DEMULTIPLEXING UNIT
211c DEMODULATION UNIT
211d DECODING UNIT
212, 312, 412 TRANSMISSION PROCESSING UNIT
212a ENCODING UNIT
212b MODULATION UNIT
212c MULTIPLEXING UNIT
212d RADIO TRANSMITTING UNIT
214, 314, 414 ANTENNA
241, 341, 451 ACQUISITION UNIT
242, 342, 452 CONVERSION UNIT
243, 343, 453 SETTING UNIT
244, 344, 454 RECEPTION UNIT
245, 345, 455 TRANSMITTING UNIT

The invention claimed is:

1. A first communication device, comprising:
circuitry configured to:
acquire a bit sequence;
convert the bit sequence to a predetermined complex constellation point sequence including a plurality of complex constellation points, wherein
the plurality of complex constellation points includes a non-zero complex constellation point and a zero complex constellation point,
at least one of a plurality of predetermined complex constellation point sequences is a first complex constellation point sequence in which each of the plurality of complex constellation points constituting the predetermined complex constellation point sequence is converted to any complex constellation point or zero complex constellation point of a first signal constellation, and
the first signal constellation includes non-power of two number of complex constellation points; and
convert at least one of a plurality of bit sequences to the first complex constellation point sequence.

2. The first communication device according to claim 1, wherein each of the non-power of two number of complex constellation points constituting the first signal constellation is a non-zero complex constellation point.

3. The first communication device according to claim 2, wherein
the plurality of complex constellation points constituting the predetermined complex constellation point sequence is mapped to a plurality of resource elements, and
the circuitry is further configured to convert the bit sequence to the first complex constellation point sequence, when a number of combination candidates for mapping of the plurality of complex constellation points to the plurality of resource elements is not a power of two.

4. The first communication device according to claim 3, wherein
one of the plurality of predetermined complex constellation point sequences is a second complex constellation point sequence in which each of the plurality of complex constellation points constituting the predetermined complex constellation point sequence is converted to any complex constellation point or zero complex constellation point of a second signal constellation,
the second signal constellation includes power of two number of complex constellation points, and
the circuitry is further configured to convert the bit sequence to the second complex constellation point sequence, when the number of combination candidates for mapping of the plurality of complex constellation points to the plurality of resource elements is a power of two.

5. The first communication device according to claim 1, wherein the circuitry is further configured to perform setting for the predetermined complex constellation point sequence.

6. The first communication device according to claim 5, wherein the circuitry is further configured to set a number of complex constellation points constituting the first signal constellation to maximize Euclidean distance between any two sequences of candidates of the predetermined complex constellation point sequence.

7. The first communication device according to claim 5, wherein
the plurality of complex constellation points constituting the predetermined complex constellation point sequence is mapped to a plurality of resource elements, and
the circuitry is further configured to set information for determination of a number of candidates of the first complex constellation point sequence to reduce a difference between the number of candidates of the first complex constellation point sequence and a power of two relative to a difference between a number of combination candidates for mapping of the plurality of complex constellation points to the plurality of resource elements and another power of two.

8. The first communication device according to claim 5, wherein the circuitry is further configured to set an amplitude of a complex constellation point so that the non-power of two number of complex constellation points have an average power of a specific value.

9. The first communication device according to claim 1, wherein the non-power of two number of complex constellation points constituting the first signal constellation are complex constellation points having equal amplitudes.

10. The first communication device according to claim 1, wherein phase intervals between the non-power of two number of complex constellation points constituting the first signal constellation are equal.

11. The first communication device according to claim 1, wherein the circuitry is further configured to:
acquire setting information associated with the predetermined complex constellation point sequence, wherein
the acquired setting information associated with the predetermined complex constellation point sequence is from a second communication device,
the second communication device is a communication partner.

12. The first communication device according to claim 1, wherein the circuitry is further configured to:
acquire setting information associated with the predetermined complex constellation point sequence
from a second communication device, wherein
the second communication device is different from a communication partner.

13. The first communication device according to claim 12, wherein the second communication device different from the communication partner is a base station device.

14. A communication method, comprising:
acquiring a bit sequence; and
converting the bit sequence to a predetermined complex constellation point sequence including a plurality of complex constellation points, wherein the plurality of complex constellation points includes a non-zero complex constellation point and a zero complex constellation point, at least one of a plurality of predetermined complex constellation point sequences is a first complex constellation point sequence in which each of the plurality of complex constellation points constituting the predetermined complex constellation point sequence is converted to any complex constellation point or zero complex constellation point of a first signal constellation, the first signal constellation includes non-power of two number of complex constellation points, and the converting the bit sequence to the predetermined complex constellation point sequence includes converting at least one of a plurality of bit sequences to the first complex constellation point sequence.

15. A non-transitory computer-readable medium having stored thereon, computer-executable instructions which, when executed by a computer, cause the computer to execute operations, the operations comprising:

acquiring a bit sequence; and converting the bit sequence to a predetermined complex constellation point sequence including a plurality of complex constellation points, wherein the plurality of complex constellation points includes a non-zero complex constellation point and a zero complex constellation point, at least one of a plurality of predetermined complex constellation point sequences is a first complex constellation point sequence in which each of the plurality of complex constellation points constituting the predetermined complex constellation point sequence is converted to any complex constellation point or zero complex constellation point of a first signal constellation, the first signal constellation includes non-power of two number of complex constellation points, and the converting the bit sequence to the predetermined complex constellation point sequence includes converting at least one of a plurality of bit sequences to the first complex constellation point sequence.

\* \* \* \* \*